United States Patent
Chen

(10) Patent No.: US 10,386,605 B2
(45) Date of Patent: Aug. 20, 2019

(54) OPTICAL PHOTOGRAPHING ASSEMBLY, IMAGE CAPTURING APPARATUS, AND ELECTRONIC DEVICE COMPRISING FIVE-LENS SYSTEM HAVING INFLECTION POINT

(71) Applicant: LARGAN PRECISION CO., LTD., Taichung (TW)

(72) Inventor: Chun-Yen Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 350 days.

(21) Appl. No.: 15/296,149

(22) Filed: Oct. 18, 2016

(65) Prior Publication Data

US 2018/0017767 A1    Jan. 18, 2018

(30) Foreign Application Priority Data

Jul. 14, 2016   (TW) .............................. 105122251 A

(51) Int. Cl.
 *G02B 9/60*   (2006.01)
 *G02B 13/00*   (2006.01)
 *G02B 27/64*   (2006.01)

(52) U.S. Cl.
 CPC ..... *G02B 13/0045* (2013.01); *G02B 13/0065* (2013.01); *G02B 27/646* (2013.01); *G02B 9/60* (2013.01)

(58) Field of Classification Search
 CPC .............................. G02B 9/60; G02B 13/0045

USPC ......................... 359/708, 714, 746, 763–766
See application file for complete search history.

(56) References Cited

U.S. PATENT DOCUMENTS

| | | | |
|---|---|---|---|
| 7,616,393 | B2 | 11/2009 | Border et al. |
| 7,969,499 | B2 | 6/2011 | Sato |
| 8,107,004 | B2 | 1/2012 | Nomura et al. |
| 8,416,508 | B2 | 4/2013 | Saori et al. |
| 8,570,668 | B2 | 10/2013 | Takakubo et al. |
| 9,172,856 | B2 | 10/2015 | Bohn et al. |
| 9,204,049 | B2 | 12/2015 | Nomura et al. |
| 2015/0286033 | A1 | 10/2015 | Osborne |
| 2015/0288865 | A1 | 10/2015 | Osborne |
| 2015/0293329 | A1 | 10/2015 | Gong |
| 2016/0044247 | A1 | 2/2016 | Shabtay et al. |
| 2016/0044250 | A1 | 2/2016 | Shabtay et al. |
| 2016/0062136 | A1 | 3/2016 | Nomura et al. |
| 2016/0112642 | A1 | 4/2016 | Bohn et al. |

(Continued)

*Primary Examiner* — Stephone B Allen
*Assistant Examiner* — Ryan S Dunning
(74) *Attorney, Agent, or Firm* — McClure, Qualey & Rodack, LLP

(57) ABSTRACT

An optical photographing assembly includes, in order from an object side to an image side along an optical axis, a first lens element, a second lens element, a third lens element, a fourth lens element and a fifth lens element. The first lens element has positive refractive power. The third lens element has at least one of an object-side surface and an image-side surface being aspheric. The fourth lens element has at least one of an object-side surface and an image-side surface being aspheric. The fifth lens element has at least one of an object-side surface and an image-side surface being aspheric, wherein at least one of the object-side surface and the image-side surface of the fifth lens element includes at least one inflection point.

22 Claims, 31 Drawing Sheets

(56) References Cited

U.S. PATENT DOCUMENTS

2017/0199360 A1    7/2017  Chang
2017/0269329 A1*  9/2017  Jhang ........................ G02B 9/60

* cited by examiner

OPTICAL PHOTOGRAPHING ASSEMBLY, IMAGE CAPTURING APPARATUS, AND ELECTRONIC DEVICE COMPRISING FIVE-LENS SYSTEM HAVING INFLECTION POINT

RELATED APPLICATIONS

This application claims priority to Taiwan Application Serial Number 105122251, filed Jul. 14, 2016, which is herein incorporated by reference.

BACKGROUND

Technical Field

The present disclosure relates to an optical photographing assembly and an image capturing apparatus. More particularly, the present disclosure relates to a miniaturized optical photographing assembly and a miniaturized image capturing apparatus with a telephoto characteristic applicable to electronic devices.

Description of Related Art

With the variety of the application of photographing modules, market requirement of miniaturization and image quality is further demanded, especially portable device products which is closer to the public demand. For obtaining extensive experiences in utilizations of the photographing modules, intelligent devices with one, two or more than three lens assemblies are the market mainstream, and angle of field of view of photographing modules should also be varied.

Conventional telephoto lens assembly is limited by surface shapes or materials of lens elements, so that the volume cannot be reduced easily and price is too high, and further the application range is limited. Hence, one of the goals in the optical lens industry is to find out how to satisfy market specification and demand under the arrangement of telephoto characteristic, miniaturization and high image quality at the same time, and applicable to portable device, compact electronic device, zoom device, multiple lens assemblies device, etc.

SUMMARY

According to one aspect of the present disclosure, an optical photographing assembly includes, in order from an object side to an image side along an optical axis, a first lens element, a second lens element, a third lens element, a fourth lens element and a fifth lens element. The first lens element has positive refractive power. The third lens element has at least one of an object-side surface and an image-side surface being aspheric. The fourth lens element has at least one of an object-side surface and an image-side surface being aspheric. The fifth lens element has at least one of an object-side surface and an image-side surface being aspheric, wherein at least one of the object-side surface and the image-side surface of the fifth lens element includes at least one inflection point. The optical photographing assembly has a total of five lens elements, there is an air space between every two lens elements of the first lens element, the second lens element, the third lens element, the fourth lens element and the fifth lens element that are adjacent to each other. When a maximum field of view of the optical photographing assembly is FOV, an axial distance between an image-side surface of one lens element closest to an image surface and the image surface is BL, an axial distance between an object-side surface of one lens element closest to an imaged object and the image-side surface of the lens element closest to the image surface is TD, an axial distance between the second lens element and the third lens element is T23, a central thickness of the first lens element is CT1, a focal length of the optical photographing assembly is f, and a curvature radius of the object-side surface of the fourth lens element is R7, the following conditions are satisfied:

$0.10 < \tan(FOV) < 0.85;$ $0.75 < BL/TD < 1.50;$ $0 < T23/CT1 < 0.60;$ and $-9.50 < f/R7 < 1.50.$ According to another aspect of the present disclosure, an image capturing apparatus includes the optical photographing assembly of the aforementioned aspect and an image sensor, wherein the image sensor is disposed on the image surface of the optical photographing assembly.

According to yet another aspect of the present disclosure, an electronic device includes the image capturing apparatus of the aforementioned aspect.

According to further another aspect of the present disclosure, an optical photographing assembly includes, in order from an object side to an image side along an optical axis, an object-side reflective element, a plurality of lens elements and an image-side reflective element. The object-side reflective element has no refractive power. At least one surface of at least one of the lens elements is aspheric and includes at least one inflection point. The image-side reflective element has no refractive power. There is no lens element along the optical axis between the object-side reflective element and an imaged object, and there is no lens element along the optical axis between the image-side reflective element and an image surface. When a maximum field of view of the optical photographing assembly is FOV, an axial distance between an image-side surface of one lens element closest to an image surface and the image surface is BL, an axial distance between an object-side surface of one lens element closest to an imaged object and the image-side surface of the lens element closest to the image surface is TD, a width parallel to the optical axis of the object-side reflective element is WPO, a width parallel to the optical axis of the image-side reflective element is WPI, and a focal length of the optical photographing assembly is f, the following conditions are satisfied:

$0.10 < \tan(FOV) < 1.0;$ $0.55 < BL/TD < 1.80;$ and $0.70 < (WPO+WPI)/f < 1.50.$ According to still another aspect of the present disclosure, an image capturing apparatus includes the optical photographing assembly of the aforementioned aspect and an image sensor, wherein the image sensor is disposed on the image surface of the optical photographing assembly. The optical photographing assembly is movable in the image capturing apparatus for stabilizing an image.

According to yet another aspect of the present disclosure, an electronic device includes the image capturing apparatus of the aforementioned aspect, wherein a thickness of the electronic device is smaller than the focal length of the optical photographing assembly of the image capturing apparatus.

BRIEF DESCRIPTION OF THE DRAWINGS

FIG. 10 shows spherical aberration curves, astigmatic field curves and a distortion curve of the optical photographing assembly according to the 5th embodiment.

DETAILED DESCRIPTION

Figure 1A:
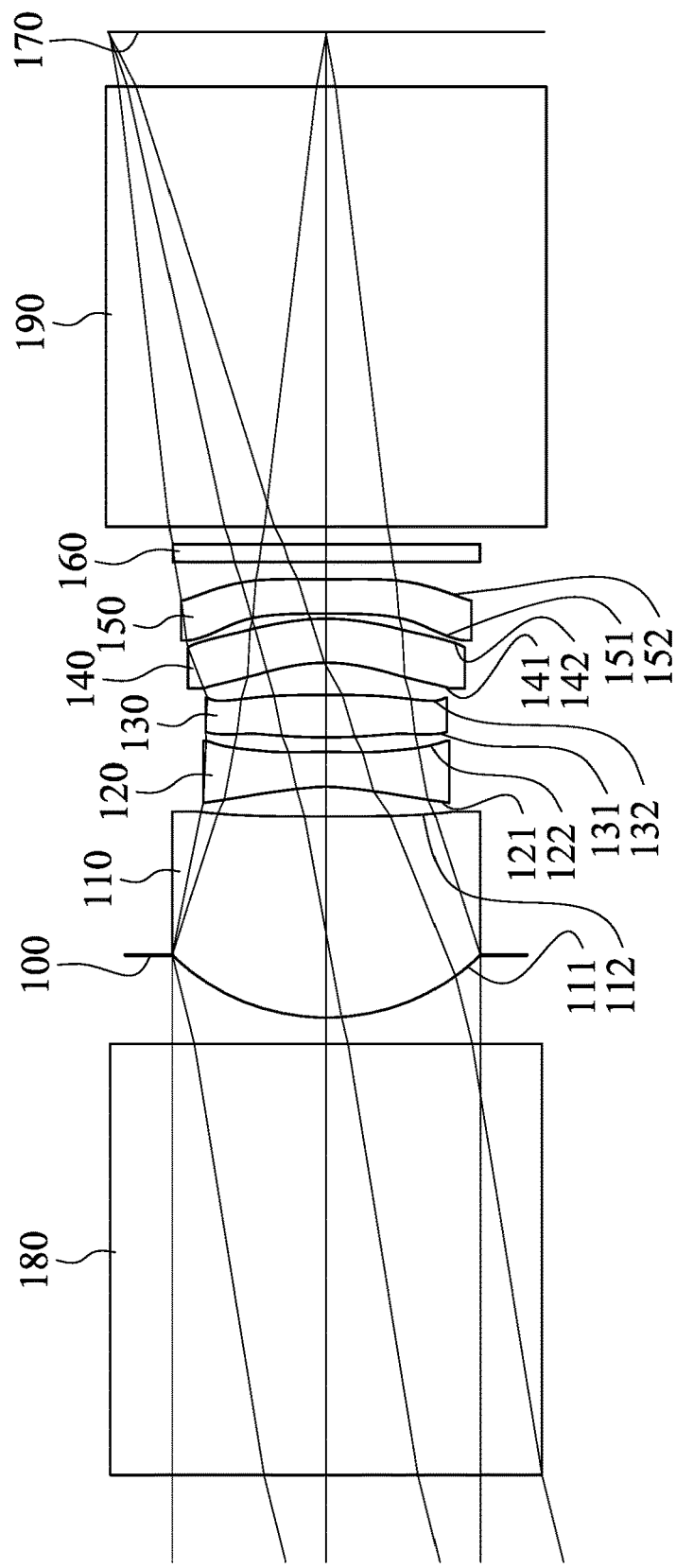
FIG. 1A is a schematic view of an optical photographing assembly according to the 1st embodiment of the present disclosure.

An optical photographing assembly includes, in order from an object side to an image side along an optical axis, a first lens element, a second lens element, a third lens element, a fourth lens element and a fifth lens element, wherein the optical photographing assembly has a total of five lens elements.

According to the optical photographing assembly of the present disclosure, there is an air space between every two lens elements of the first lens element, the second lens element, the third lens element, the fourth lens element and the fifth lens element that are adjacent to each other. That is, each of the first through fifth lens elements is a single and non-cemented lens element, and there is a space between every two adjacent lens elements. Moreover, the manufacturing process of the cemented lenses is more complex than the non-cemented lenses. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the optical photographing assembly. Therefore, according to the optical photographing assembly of the present disclosure, having an air space in a paraxial region between every two adjacent lens elements avoids the problem generated by the cemented lens elements.

The first lens element can have positive refractive power, so that the main light converging ability can be provided so as to reduce the total track length of the optical photographing assembly. Further, the first lens element can have an object-side surface being convex. Therefore, it is favorable for obtaining the stronger refractive power of the first lens element so as to form the telephoto structure thereof.

The second lens element can have negative refractive power for balancing spherical aberration and chromatic aberration generated from the first lens element so as to moderate the incident light.

The third lens element can have positive refractive power. Therefore, it is favorable for guiding the incident light into the optical photographing assembly by balancing the positive refractive power of the first lens element.

The fourth lens element can have negative refractive power. Therefore, it is favorable for balancing arrangements of the telephoto structure and the back focal length so as to achieve compact and telephoto effects.

The fifth lens element can have an image-side surface being concave, so that aberrations of the optical photographing assembly can be corrected, and size of the lens barrel can be also reduced. Furthermore, at least one of an object-side surface and the image-side surface of the fifth lens element includes at least one inflection point. Therefore, it is also favorable for controlling the incident angle onto the image surface effectively so as to reduce the effective diameter of the back focusing range and will not affect the application of the optical photographing assembly.

When a maximum field of view of the optical photographing assembly is FOV, the following condition is satisfied: $0.10<\tan(FOV)<1.0$. Therefore, it is favorable for capturing the image far from the optical photographing assembly, and increasing the resolution of partial image so as to obtain the telephoto effect. More preferably, the following condition can be satisfied: $0.10<\tan(FOV)<0.85$. More preferably, the following condition can be satisfied: $0.45<\tan(FOV)<0.70$.

When an axial distance between an image-side surface of one lens element closest to an image surface and the image surface is BL, and an axial distance between an object-side surface of one lens element closest to an imaged object and the image-side surface of the lens element closest to the image surface is TD, the following condition is satisfied: $0.55<BL/TD<1.80$. Therefore, it is favorable for controlling the back focal length of the optical photographing assembly, so that the sufficient focal length can be obtained with miniature space, and the telephoto effect and reduced thickness of the optical photographing assembly can be both satisfied. More preferably, the following condition can be satisfied: $0.75<BL/TD<1.50$.

When an axial distance between the second lens element and the third lens element is T23, and a central thickness of the first lens element is CT1, the following condition is satisfied: $0<T23/CT1<0.60$. Therefore, it is favorable for adapting variation of environment and strengthening the utility of the mechanism of the optical photographing assembly by providing the first lens element with sufficient thickness, and waste of space can also be avoided by reducing the distance between the second lens element and the third lens element. More preferably, the following condition can be satisfied: $0<T23/CT1<0.25$.

When a focal length of the optical photographing assembly is f, and a curvature radius of the object-side surface of the fourth lens element is R7, the following condition is satisfied: $-9.50<f/R7<1.50$. Therefore, it is favorable for avoiding serious aberrations generated from excessive curvature by controlling the curvature of the object-side surface of the fourth lens element effectively. More preferably, the following condition can be satisfied: $-6.50<f/R7<0.50$.

When the focal length of the optical photographing assembly is f, and the axial distance between the object-side surface of the lens element closest to the imaged object and the image-side surface of the lens element closest to the image surface is TD, the following condition is satisfied: $1.50<f/TD<2.50$. Therefore, the contribution of the focal length and the arrangement of the lens elements of optical photographing assembly can be balanced so as to reduce the length of the arrangement of the lens elements and the effective radius thereof. More preferably, the following condition can be satisfied: $1.72<f/TD<2.20$.

The optical photographing assembly can further includes an aperture stop, wherein when an axial distance between the aperture stop and the image-side surface of the lens element closest to the image surface is SD, and the axial distance between the object-side surface of the lens element closest to the imaged object and the image-side surface of the lens element closest to the image surface is TD, the following condition is satisfied: $0.80<SD/TD<1.10$. Therefore, it is favorable for forming the telephoto structure and controlling the total track length of the optical photographing assembly by adjusting the location of the aperture stop effectively.

When the focal length of the optical photographing assembly is f, and a focal length of the fourth lens element is f4, the following condition is satisfied: $-1.0<f/f4<1.0$. Therefore, it is favorable for balancing the telephoto structure and the proper back focal length by controlling the refractive power of the fourth lens element effectively.

When the focal length of the optical photographing assembly is f, and a focal length of the fifth lens element is f5, and the following condition is satisfied: $-1.0<f/f5<1.0$. Therefore, it is favorable for correcting off-axial aberration by controlling the refractive power of the fifth lens element effectively.

When a focal length of the first lens element is f1, a focal length of the second lens element is f2, and the following condition is satisfied: $|f1/f2|<1.0$. Therefore, it is favorable for reducing the total track length and obtaining the telephoto structure at the same time by balancing the refractive power of the first lens element and the second lens element.

When a sum of thicknesses of the lens elements of the optical photographing assembly is $\Sigma CT$, and a sum of axial distances between every two of the lens elements of the optical photographing assembly that are adjacent to each other is $\Sigma AT$, the following condition is satisfied: $3.0<\Sigma CT/\Sigma AT<5.0$. Therefore, it is favorable for reducing the sensitivity, assembling the optical photographing assembly and effectively utilizing the space by properly distributing the proportion of the lens elements arranged in the optical photographing assembly.

When the central thickness of the first lens element is CT1, and a sum of thicknesses of the lens elements of the optical photographing assembly is $\Sigma CT$, the following condition is satisfied: $0.50<CT1/(\Sigma CT-CT1)<1.80$. Therefore, the structure of the first lens element is stable so as to maintain the image quality far from the environment factor.

When an Abbe number of the second lens element is V2, the following condition is satisfied: $V2<27.0$. Therefore, it is favorable for correcting chromatic aberration of the optical photographing assembly.

When an Abbe number of the third lens element is V3, the following condition is satisfied: V3<27.0. Therefore, it is favorable for miniaturizing the optical photographing assembly with a telephoto characteristic by reducing the volume thereof.

When an Abbe number of the fourth lens element is V4, the following condition is satisfied: V4<27.0. Therefore, it is favorable for adjusting lights with different wavelength to image on the same image surface so as to avoid the overlap of the image.

When an effective radius of a lens surface closest to the imaged object is Yo, and an effective radius of a lens surface closest to the image surface is Yi, the following condition is satisfied: 0.95<Yo/Yi<1.15. Therefore, the brightness of the image is even due to control ranges of incident light and the outgoing light effectively.

When a maximum among effective radii of object-side and image-side surfaces of the lens elements of the optical photographing assembly is Ymax, and a minimum among effective radii of the object-side and the image-side surfaces of the lens elements of the optical photographing assembly is Ymin, the following condition is satisfied: 1.0<Ymax/Ymin<1.50. Therefore, the effective radius of each lens element of the optical photographing assembly can be balanced, so that the efficiency of molding of the lens elements would not be affected by avoiding the excessive difference among the lens elements.

When an axial distance between an object-side surface of the first lens element and the aperture stop is Dr1s, and an axial distance between an image-side surface of the first lens element and the aperture stop is Dr2s, the following condition is satisfied: 0<|Dr1s/Dr2s|<1.0. Therefore, the relative location of the aperture stop and the first lens element can be balanced so as to control the total track length of the optical photographing assembly.

When a curvature radius of an object-side surface of the second lens element is R3, and a curvature radius of an image-side surface of the second lens element is R4, the following condition is satisfied: −1.5<(R3−R4)/(R3+R4)<0. Therefore, it is favorable for correcting astigmatism by concentrating the refractive power of the second lens element on the object side.

When a curvature radius of the object-side surface of the third lens element is R5, and a curvature radius of the image-side surface of the third lens element is R6, the following condition is satisfied: −2.0<(R5+R6)/(R5−R6)<1.0. Therefore, the third lens element can be more symmetrical so as to increase the symmetry of the optical photographing assembly and reduce aberrations.

When the focal length of the optical photographing assembly is f, and a maximum image height of the optical photographing assembly is ImgH, the following condition is satisfied: 3.0<f/ImgH<6.0. Therefore, the ratio of the focal length of the optical photographing assembly and the light receiving range of the image surface can be balanced, so that the insufficient brightness of the image from too small light receiving range can be avoided. More preferably, the following condition can be satisfied: 3.5<f/ImgH<4.5.

The first lens element can be a movable focusing lens element, there is a relative displacement between the first lens element and the second lens element during focusing, and it is relatively stationary between every two of the second lens element, the third lens element, the fourth lens element and the fifth lens element, that is, there is no relative displacement between every two of the second lens element, the third lens element, the fourth lens element and the fifth lens element. Therefore, error from movement can be avoided by fixing the lens elements mostly, and the sensitivity of the optical photographing assembly can also be reduced. In an optical system, an object distance is an axial distance between the imaged object and an object end of the optical photographing assembly. The optical photographing assembly of the present disclosure, when an axial distance between the first lens element and the second lens element with an object distance at infinity is T12i, and an axial distance between the first lens element and the second lens element with the object distance at 400 mm is T12m, the following condition is satisfied: 0.50<T12i/T12m<0.95. Therefore, it is favorable for compensating vague image from different object distances by controlling the movement ratio of the first lens element, and the moving range of the optical photographing assembly can be lessened so as to reduce dissipative energy and further avoid the noise from the excessive vibration.

The optical photographing assembly can further include at least one prism on the optical axis. Therefore, it is favorable for diverting the optical path, and the demand of the diversion space on the back focusing range can be reduced. In detail, the prism can be disposed at the object side of the first lens element or disposed at the image side of the fifth lens element. When the axial distance between the object-side surface of the lens element closest to the imaged object and the image-side surface of the lens element closest to the image surface is TD, and a sum of light path lengths on the optical axis in the at least one prism is TP, the following condition is satisfied: 0.80<TD/TP<1.25. Therefore, it is favorable for controlling the arrangement of the lens elements effectively, and the volume of the optical photographing assembly with the prism can be miniaturized.

Another one optical photographing assembly of the present disclosure includes, in order from an object side to an image side along an optical axis, an object-side reflective element, a plurality of lens elements and an image-side reflective element. Both of the object-side reflective element and the image-side reflective element have no refractive power. At least one surface of at least one of the lens elements is aspheric and includes at least one inflection point. There is no lens element along the optical axis between the object-side reflective element and an imaged object, and there is no lens element along the optical axis between the image-side reflective element and an image surface.

The optical photographing assembly has a total of five lens elements, which are, in order from an object side to an image side along an optical axis, a first lens element, a second lens element, a third lens element, a fourth lens element and a fifth lens element. The corresponding conditions are the same as the aforementioned descriptions, and will not state again herein.

At least one surface of each of the fourth lens element and the fifth lens element is aspheric. Therefore, off-axial aberration of the optical photographing assembly can be corrected.

When a width parallel to the optical axis of the object-side reflective element is WPO, a width parallel to the optical axis of the image-side reflective element is WPI, and the focal length of the optical photographing assembly is f, the following condition is satisfied: 0.70<(WPO+WPI)/f<1.50. Therefore, it is favorable for increasing the utilizing efficiency of the electronic device by adjusting the size of the reflective elements and balancing the size of the reflective elements and the focal length of the optical photographing assembly.

Each of the object-side reflective element and the image-side reflective element can be made of a plastic material or a glass material, and can be a prism or a mirror. When the object-side reflective element or the image-side reflective element is made of a plastic material, manufacturing costs and weight of the optical photographing assembly can be reduced, and variability thereof can also be increased. When the object-side reflective element or the image-side reflective element is a prism, which is favorable for distributing space so as to obtain the sufficient diversion space of the optical path. When an Abbe number of the object-side reflective element is VRO, and an Abbe number of the image-side reflective element is VRI, the following condition is satisfied: VRO<60.0; and VRI<60.0. Therefore, the electronic device can obtain the diversion effect of the optical path utilizing the smaller space, so that it is favorable for reducing the volume of the prism and then reducing the volume of the electronic device.

When an axial distance between the object-side reflective element and the image-side reflective element is DP, the width parallel to the optical axis of the object-side reflective element is WPO, and the width parallel to the optical axis of the image-side reflective element is WPI, the following condition is satisfied: 0.50<DP/(WPO+WPI)<0.80. Therefore, it is favorable for forming the telephoto structure and reducing the volume of the optical photographing assembly so as to reach the most efficient application thereof.

An incident light through the object-side reflective element into the optical photographing assembly and an outgoing light through the image-side reflective element are on the same side of the optical axis of the lens elements.

Therefore, the space can be fully utilized, and the space arrangement of the entire electronic device can have unity.

The plurality of lens elements of the optical photographing assembly can include three lens elements, and an Abbe number of each of the three lens elements is smaller than 27.0. Therefore, it is favorable for miniaturizing the optical photographing assembly with the telephoto characteristic so as to reduce the volume and correct chromatic aberration.

When a focal length of the first lens element is f1, a focal length of the second lens element is f2, and the focal length of the optical photographing assembly is f, the following condition is satisfied: 3.30<|f/f1|+|f/f2|<5.80. Therefore, it is favorable for obtaining the telephoto effect by arranging the stronger refractive power on the object side.

According to the optical photographing assembly of the present disclosure, the lens elements thereof can be made of glass or plastic materials. When the lens elements are made of glass materials, the distribution of the refractive power of the optical photographing assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical photographing assembly. Therefore, the total track length of the optical photographing assembly can also be reduced.

According to the optical photographing assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof. According to the optical photographing assembly of the present disclosure, the refractive power or the focal length of a lens element being positive or negative may refer to the refractive power or the focal length in a paraxial region of the lens element.

According to the optical photographing assembly of the present disclosure, the optical photographing assembly can include at least one stop, such as an aperture stop, a glare stop or a field stop. Said glare stop or said field stop is for eliminating the stray light and thereby improving the image resolution thereof.

According to the optical photographing assembly of the present disclosure, the image surface of the optical image lens assembly, based on the corresponding image sensor, can be flat or curved. In particular, the image surface can be a curved surface being concave facing towards the object side.

According to the optical photographing assembly of the present disclosure, an aperture stop can be configured as a front stop a middle stop. A front stop disposed between an object and the first lens element can provide a longer distance between an exit pupil of the optical photographing assembly and the image surface, and thereby obtains a telecentric effect and improves the image-sensing efficiency of the image sensor, such as CCD or CMOS. A middle stop disposed between the first lens element and the image surface is favorable for enlarging the field of view of the optical photographing assembly and thereby provides a wider field of view for the same.

According to the optical photographing assembly of the present disclosure, the optical photographing assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing apparatus is provided. The image capturing apparatus includes the aforementioned optical photographing assembly and an image sensor, wherein the image sensor is disposed on the image side of the aforementioned optical photographing assembly, that is, the image sensor can be disposed on or near the image surface of the aforementioned optical photographing assembly. In the image capturing apparatus, the optical photographing assembly is movable for stabilizing an image, for example, the image capturing apparatus 1100 can further include optical image stabilization (OIS) functionality. Therefore, vague image caused from insufficient light or vibration can be corrected and compensated. Preferably, the image capturing apparatus can further include a barrel member, a holder member or a combination thereof.

According to the present disclosure, an electronic device is provided, which includes the aforementioned image capturing apparatus. A thickness of the electronic device is smaller than the focal length of the optical photographing assembly of the image capturing apparatus. Therefore, it is favorable for miniaturizing the electronic device and applying to wider utilization. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
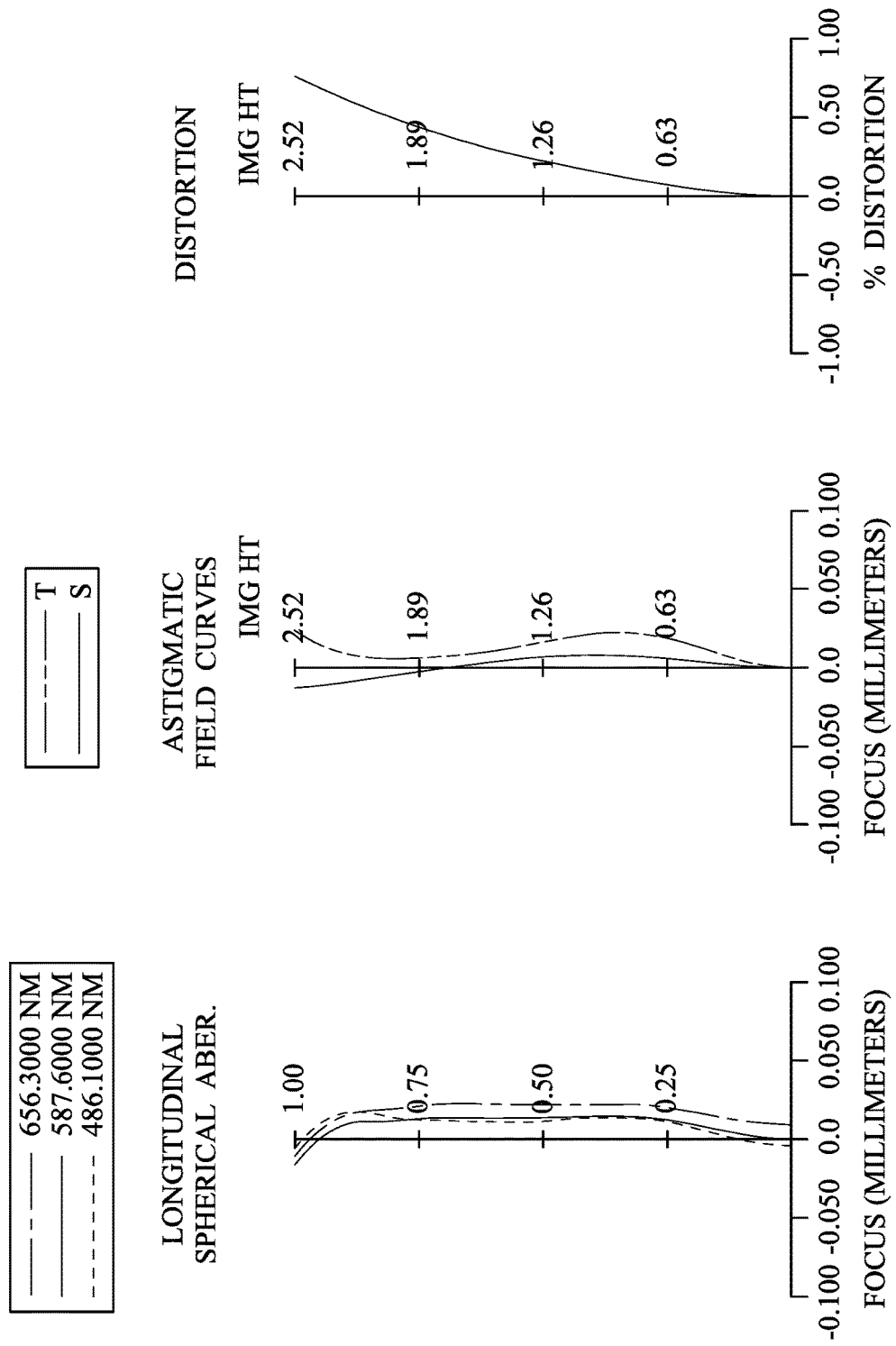
FIG. 2 shows spherical aberration curves, astigmatic field curves and a distortion curve of the optical photographing assembly according to the 1st embodiment.

FIG. 1A is a schematic view of an optical photographing assembly according to the 1st embodiment of the present disclosure. FIG. 2 shows spherical aberration curves, astigmatic field curves and a distortion curve of the optical photographing assembly according to the 1st embodiment. In FIG. 1A, the optical photographing assembly includes, in order from an object side to an image side, a prism 180, an aperture stop 100, a first lens element 110, a second lens element 120, a third lens element 130, a fourth lens element 140, a fifth lens element 150, a filter 160, a prism 190 and an image surface 170. The optical photographing assembly has a total of five lens elements (110-150), and there is an air space between every two lens elements of the first lens element 110, the second lens element 120, the third lens element 130, the fourth lens element 140 and the fifth lens element 150 that are adjacent to each other.

The first lens element 110 with positive refractive power has an object-side surface 111 being convex and an image-side surface 112 being convex. The first lens element 110 is made of a plastic material, and has the object-side surface 111 and the image-side surface 112 being both aspheric.

The second lens element 120 with negative refractive power has an object-side surface 121 being concave and an image-side surface 122 being convex. The second lens element 120 is made of a plastic material, and has the object-side surface 121 and the image-side surface 122 being both aspheric.

The third lens element 130 with positive refractive power has an object-side surface 131 being convex and an image-side surface 132 being convex. The third lens element 130 is made of a plastic material, and has the object-side surface 131 and the image-side surface 132 being both aspheric.

The fourth lens element 140 with negative refractive power has an object-side surface 141 being concave and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being convex and an image-side surface 152 being concave. The fifth lens element 150 is made of a plastic material, and has the object-side surface 151 and the image-side surface 152 being both aspheric. Furthermore, both of the object-side surface 151 and the image-side surface 152 of the fifth lens element 150 include at least one inflection point.

The filter 160 is made of a glass material and located between the fifth lens element 150 and the image surface 170, and will not affect the focal length of the optical photographing assembly.

In the optical photographing assembly according to the 1st embodiment, the optical photographing assembly includes two prisms 180, 190 which are made of glass materials. The prism 180 can be an object-side reflective element located between an imaged object (its reference numeral is omitted) and the aperture stop 100 on an optical path (which is located on an optical axis of the optical photographing assembly according to the 1st embodiment). The prism 190 can be an image-side reflective element located between the filter 160 and the image surface 170 on the optical path (which is located on the optical axis of the optical photographing assembly according to the 1st embodiment).

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i} (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing assembly according to the 1st embodiment, when a focal length of the optical photographing assembly is f, an f-number of the optical photographing assembly is Fno, and half of a maximum field of view of the optical photographing assembly is HFOV, these parameters have the following values: f=10.00 mm, Fno=2.80; and HFOV=14.0 degrees.

In the optical photographing assembly according to the 1st embodiment, when an Abbe number of the second lens element 120 is V2, an Abbe number of the third lens element 130 is V3, and an Abbe number of the fourth lens element 140 is V4, the following conditions are satisfied: V2=20.4; V3=20.4; and V4=20.4.

In the optical photographing assembly according to the 1st embodiment, when a maximum field of view of the optical photographing assembly is FOV, the following condition is satisfied: tan(FOV)=0.53.

In the optical photographing assembly according to the 1st embodiment, when an axial distance between the second lens element 120 and the third lens element 130 is T23, and a central thickness of the first lens element 110 is CT1, the following condition is satisfied: T23/CT1=0.07.

In the optical photographing assembly according to the 1st embodiment, when a curvature radius of the object-side surface 121 of the second lens element 120 is R3, and a curvature radius of the image-side surface 122 of the second lens element 120 is R4, the following condition is satisfied: (R3−R4)/(R3+R4)=−0.48.

In the optical photographing assembly according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=−0.33.

In the optical photographing assembly according to the 1st embodiment, when the focal length of the optical photographing assembly is f, and a curvature radius of the object-side surface 141 of the fourth lens element 140 is R7, the following condition is satisfied: f/R7=−4.98.

In the optical photographing assembly according to the 1st embodiment, when a focal length of the first lens element 110 is f1, and a focal length of the second lens element 120 is f2, the following condition is satisfied: |f1/f2|=0.87.

In the optical photographing assembly according to the 1st embodiment, when the focal length of the optical photographing assembly is f, a focal length of the fourth lens element 140 is f4, and a focal length of the fifth lens element 150 is f5, the following conditions are satisfied: f/f4=−0.57; and f/f5=−0.31.

In the optical photographing assembly according to the 1st embodiment, when a focal length of the first lens element 110 is f1, a focal length of the second lens element 120 is f2, and the focal length of the optical photographing assembly is f, the following condition is satisfied: |f/f1|+|f/f2|=3.97.

In the optical photographing assembly according to the 1st embodiment, when the central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, and a sum of thicknesses of the lens elements of the optical photographing assembly is ΣCT (ΣCT=CT1+CT2+CT3+CT4+CT5), the following condition is satisfied: CT1/(ΣCT−CT1)=1.29.

In the optical photographing assembly according to the 1st embodiment, when the sum of thicknesses of the lens elements of the optical photographing assembly is ΣCT, an axial distance between the first lens element 110 and the second lens element 120 is T12, the axial distance between the second lens element 120 and the third lens element 130 is T23, an axial distance between the third lens element 130 and the fourth lens element 140 is T34, an axial distance between the fourth lens element 140 and the fifth lens element 150 is T45, and a sum of axial distances between every two of the lens elements of the optical photographing assembly that are adjacent to each other is ΣAT (that is, ΣAT=T12+T23+T34+T45), the following condition is satisfied: ΣCT/ΣAT=4.39.

In the optical photographing assembly according to the 1st embodiment, when the focal length of the optical photographing assembly is f, and a maximum image height of the optical photographing assembly is ImgH, the following condition is satisfied: f/ImgH=3.97.

Figure 19:
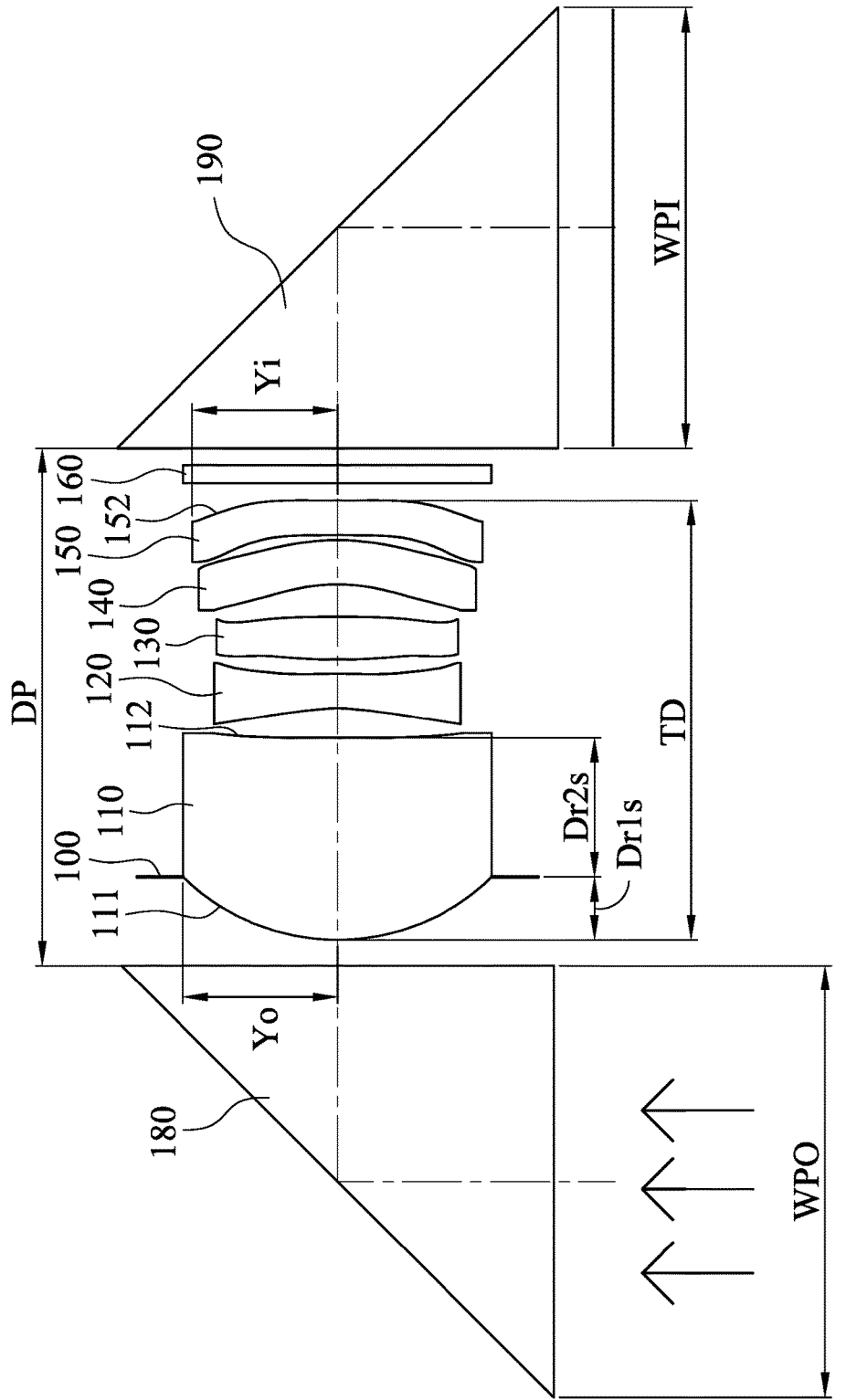
FIG. 19 is a schematic view of parameters of the optical photographing assembly according to the 1st embodiment of the present disclosure.

FIG. 19 is a schematic view of parameters of the optical photographing assembly according to the 1st embodiment of the present disclosure. In FIG. 19, when an axial distance between an object-side surface of one lens element closest to the imaged object (which is the object-side surface 111 of the first lens element 110 according to the 1st embodiment) and the image-side surface of one lens element closest to the image surface 170 (which is the image-side surface 152 of the fifth lens element 150 according to the 1st embodiment) is TD, and the focal length of the optical photographing assembly is f, the following condition is satisfied: f/TD=1.97.

In the optical photographing assembly according to the 1st embodiment, when an axial distance between the aperture stop 100 and the image-side surface of the lens element closest to the image surface 170 (which is the image-side surface 152 of the fifth lens element 150 according to the 1st embodiment) is SD, and the axial distance between the object-side surface of the lens element closest to the imaged object (which is the object-side surface 111 of the first lens element 110 according to the 1st embodiment) and the image-side surface of the lens element closest to the image surface 170 (which is the image-side surface 152 of the fifth lens element 150 according to the 1st embodiment) is TD, and the following condition is satisfied: SD/TD=0.86.

In the optical photographing assembly according to the 1st embodiment, when an axial distance between the image-side surface of the lens element closest to the image surface 170 (which is the image-side surface 152 of the fifth lens element 150 according to the 1st embodiment) and the image surface 170 is BL, and the axial distance between the object-side surface of the lens element closest to the imaged object (which is the object-side surface 111 of the first lens element 110 according to the 1st embodiment) and the image-side surface of the lens element closest to the image surface 170 (which is the image-side surface 152 of the fifth lens element 150 according to the 1st embodiment) is TD, and the following condition is satisfied: BL/TD=1.25.

Figure 20:
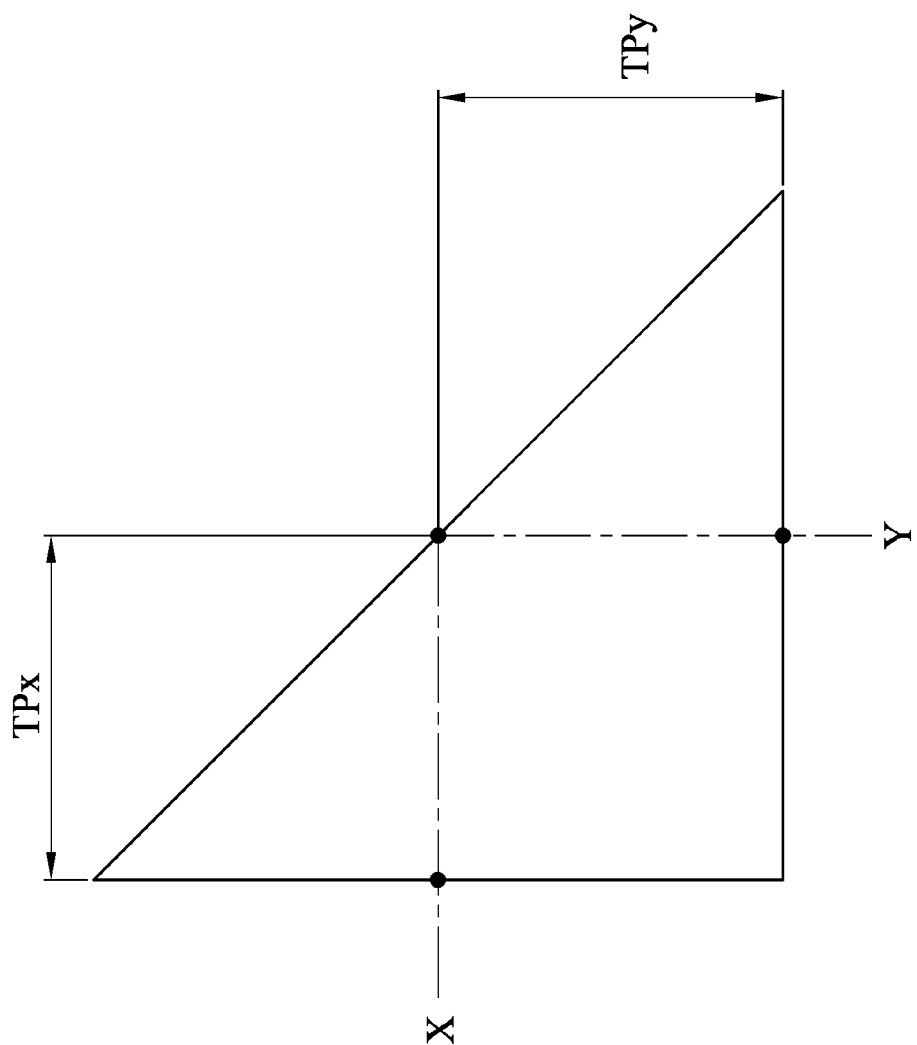
FIG. 20 is a schematic view of the parameter TP of the optical photographing assembly according to the 1st embodiment of the present disclosure.

FIG. 20 is a schematic view of the parameter TP of the optical photographing assembly according to the 1st embodiment of the present disclosure. In FIG. 20, a prism has a first optical axis path X which with a light path length TPx (that is, an optical length from an incident surface of the prism to a reflective surface of the prism) and a second optical axis path Y which with a light path length TPy (that is, an optical length from the reflective surface of the prism to an exit surface of the prism), when a sum of light path lengths on the optical axis in the one prism is TP, TP is defined as a sum of TPx and TPy, such as TP=TPx+TPy. According to the 1st embodiment, the optical photographing assembly includes two prisms 180, 190, thus the parameter TP1 is a sum of length of inner optical axis paths of the prism 180, and TP2 is a sum of length of inner optical axis paths of the prism 190, and will not illustrate respectively. In detail, in FIGS. 19 and 20, when the axial distance between the object-side surface of the lens element closest to the imaged object (which is the object-side surface 111 of the first lens element 110 according to the 1st embodiment) and the image-side surface of the lens element closest to the image surface 170 (which is the image-side surface 152 of the fifth lens element 150 according to the 1st embodiment) is TD, the sum of light path lengths on the optical axis in the prism 180 is TP1, the sum of light path lengths on the optical axis in the prism 190 is TP2 (wherein, TP1 and TP2 are satisfied the definitions of TP in FIGS. 1A-1C, the specification and the claims of the present disclosure), the following condition is satisfied: TD/TP1=1.02; and TD/TP2=1.00.

In FIG. 19, the optical photographing assembly according to the 1st embodiment, when an effective radius of a lens surface closest to the imaged object (which is the object-side surface 111 of the first lens element 110 according to the 1st embodiment) is Yo, and an effective radius of a lens surface closest to the image surface 170 (which is the image-side surface 152 of the fifth lens element 150 according to the 1st embodiment) is Yi, the following condition is satisfied: Yo/Yi=1.06.

In the optical photographing assembly according to the 1st embodiment, when a maximum among effective radii of object-side and image-side surfaces of the lens elements of the optical photographing assembly (which is an effective radius of the object-side surface 111 of the first lens element 110 according to the 1st embodiment) is Ymax, and a minimum among effective radii of the object-side and the image-side surfaces of the lens elements of the optical photographing assembly (which is an effective radius of the image-side surface 132 of the third lens element 130 according to the 1st embodiment) is Ymin, the following condition is satisfied: Ymax/Ymin=1.30.

In the optical photographing assembly according to the 1st embodiment, the prism 180 can be the object-side reflective element, the prism 190 can be an image-side reflective element, when an Abbe number of the object-side reflective element is VRO, and an Abbe number of the image-side reflective element is VRI, the following conditions are satisfied: VRO=64.2; and VRI=64.2.

In FIG. 19, the optical photographing assembly according to the 1st embodiment, when an axial distance between the object-side surface 111 of the first lens element 110 and the aperture stop 100 is Dr1s, and an axial distance between the image-side surface 112 of the first lens element 110 and the aperture stop 100 is Dr2s, the following condition is satisfied: |Dr1s/Dr2s|=0.45.

In FIG. 19, the optical photographing assembly according to the 1st embodiment, when a width parallel to the optical axis of the object-side reflective element (the prism 180) is WPO, and a width parallel to the optical axis of the image-side reflective element (the prism 190) is WPI, and the focal length of the optical photographing assembly is f, the following condition is satisfied: (WPO+WPI)/f=1.01.

In FIG. 19, the optical photographing assembly according to the 1st embodiment, when an axial distance between the object-side reflective element (the prism 180) and the image-side reflective element (the prism 190) is DP, the width parallel to the optical axis of the object-side reflective element (the prism 180) is WPO, and the width parallel to the optical axis of the image-side reflective element (the prism 190) is WPI, the following condition is satisfied: DP/(WPO+WPI)=0.59.

The detailed optical data of the 1st embodiment are shown in Table 1 and the aspheric surface data are shown in Table 2 below.

TABLE 1

1st Embodiment
f = 10.00 mm, Fno = 2.80, HFOV = 14.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 5.000 | Glass | 1.517 | 64.2 | — |
| 2 | | Plano | | 1.027 | | | | |
| 3 | Ape. Stop | Plano | | −0.727 | | | | |
| 4 | Lens 1 | 2.583 | ASP | 2.335 | Plastic | 1.544 | 55.9 | 4.70 |
| 5 | | −175.942 | ASP | 0.346 | | | | |
| 6 | Lens 2 | −2.232 | ASP | 0.400 | Plastic | 1.660 | 20.4 | −5.41 |
| 7 | | −6.368 | ASP | 0.165 | | | | |
| 8 | Lens 3 | 9.730 | ASP | 0.494 | Plastic | 1.660 | 20.4 | 9.85 |
| 9 | | −19.220 | ASP | 0.375 | | | | |
| 10 | Lens 4 | −2.008 | ASP | 0.511 | Plastic | 1.660 | 20.4 | −17.67 |
| 11 | | −2.671 | ASP | 0.057 | | | | |
| 12 | Lens 5 | 95.590 | ASP | 0.400 | Plastic | 1.544 | 55.9 | −31.91 |
| 13 | | 14.661 | ASP | 0.200 | | | | |
| 14 | Filter | Plano | | 0.210 | Glass | 1.517 | 64.2 | — |
| 15 | | Plano | | 0.200 | | | | |
| 16 | Prism | Plano | | 5.100 | Glass | 1.517 | 64.2 | — |
| 17 | | Plano | | 0.635 | | | | |
| 18 | Image | Plano | | — | | | | |

Reference wavelength is 587.6 nm (d-line).
Both of Prisms (180, 190) have reflective surface.

TABLE 2

Aspheric Coefficients

| Surface # | 4 | 5 | 6 | 7 | 8 |
|---|---|---|---|---|---|
| k = | 3.4365E−01 | −9.9000E+01 | −1.3577E+01 | −5.6125E+01 | 2.8814E+01 |
| A4 = | −2.3887E−03 | 2.2264E−02 | 1.0524E−01 | 3.2089E−01 | 1.3280E−01 |
| A6 = | 1.2932E−05 | −9.0703E−04 | −1.2145E−01 | −4.7020E−01 | −3.5569E−01 |
| A8 = | −2.8993E−04 | −1.2118E−02 | 6.5451E−02 | 4.2664E−01 | 3.8286E−01 |
| A10 = | 7.6825E−05 | 8.9939E−03 | −1.4092E−02 | −2.6340E−01 | −2.6949E−01 |
| A12 = | −1.4469E−05 | −1.8870E−03 | 4.2756E−04 | 1.0189E−01 | 1.1273E−01 |
| A14 = | | | | −1.7223E−02 | −1.9250E−02 |

| Surface # | 9 | 10 | 11 | 12 | 13 |
|---|---|---|---|---|---|
| k = | 4.1023E+01 | −3.2155E+00 | −1.8979E+00 | 8.9439E+01 | 7.2076E+01 |
| A4 = | 7.4403E−03 | 6.1164E−02 | 3.1725E−02 | −1.4698E−01 | −1.1214E−01 |
| A6 = | −1.1714E−01 | −1.4157E−01 | −1.7387E−02 | 1.0666E−01 | 6.5071E−02 |
| A8 = | 1.2701E−01 | 2.1595E−01 | 3.2344E−02 | −8.9684E−02 | −4.6684E−02 |
| A10 = | −3.9988E−02 | −1.4170E−01 | −2.8165E−02 | 4.1819E−02 | 2.2430E−02 |
| A12 = | −5.3049E−03 | 4.2022E−02 | 1.0910E−02 | −7.7463E−03 | −5.6644E−03 |
| A14 = | 4.2574E−03 | −4.7881E−03 | −1.6218E−03 | 3.9728E−04 | 5.8335E−04 |

In Table 1, the detailed optical data of the 1st embodiment shown in FIG. 1A are listed, wherein the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Figure 1B:
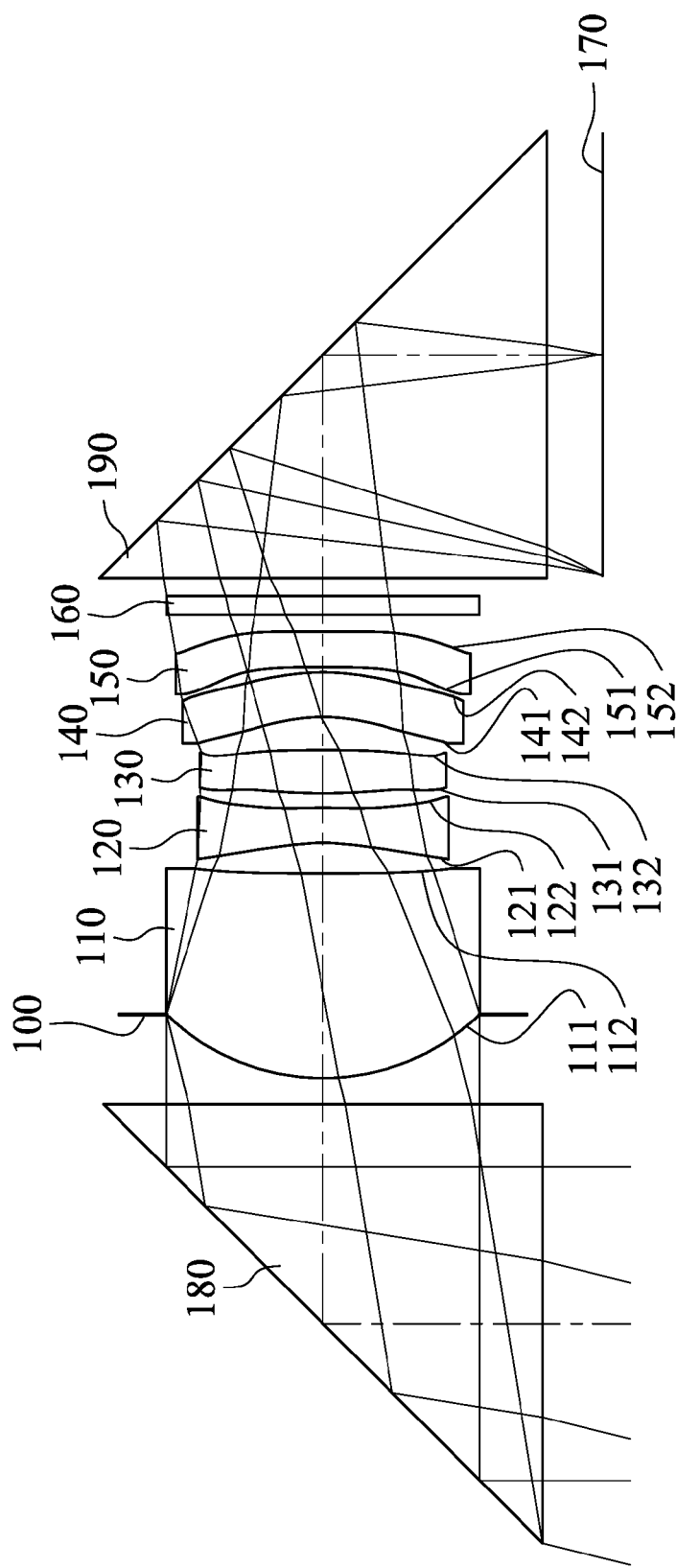
FIG. 1B is a schematic view of the optical photographing assembly according to the 1st embodiment of FIG. 1A which include different shapes and arrangements of the prisms.
Figure 1C:
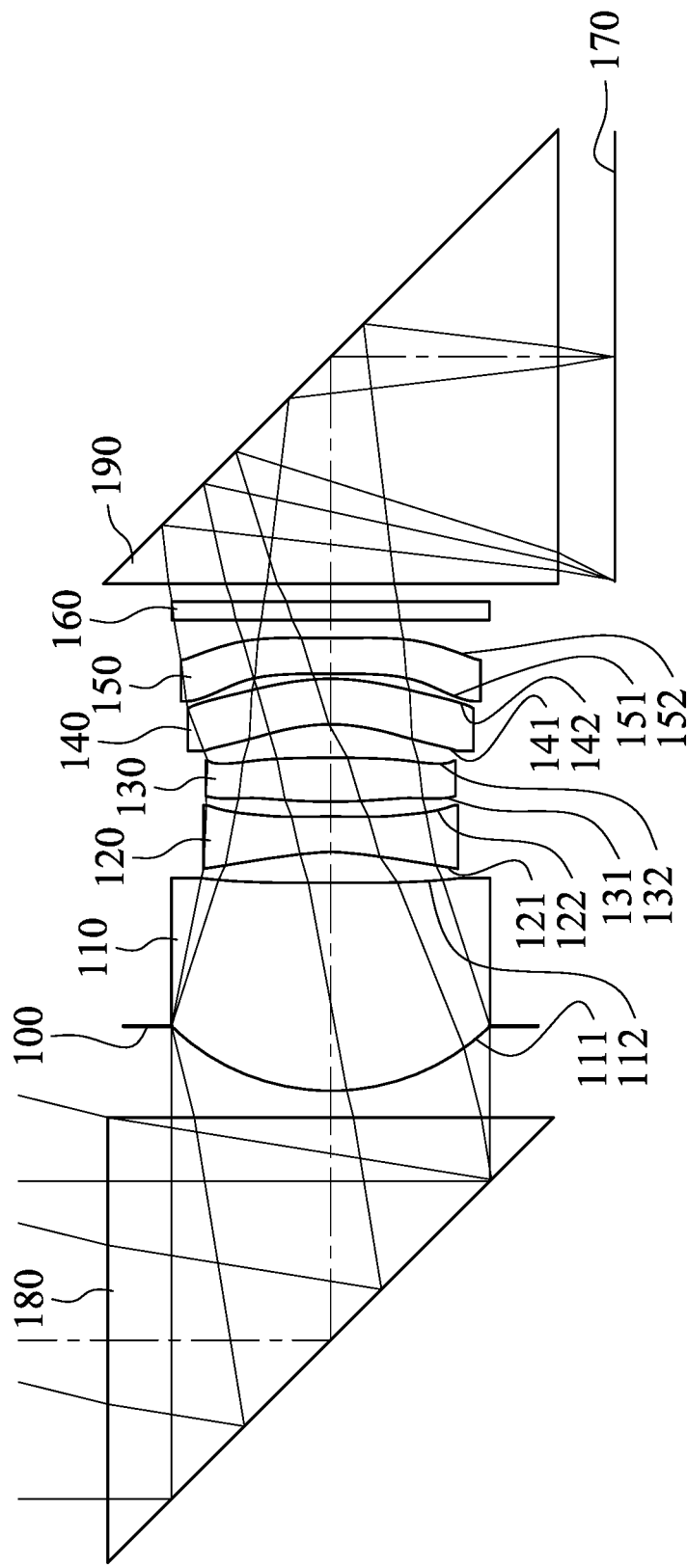
Figure 10:
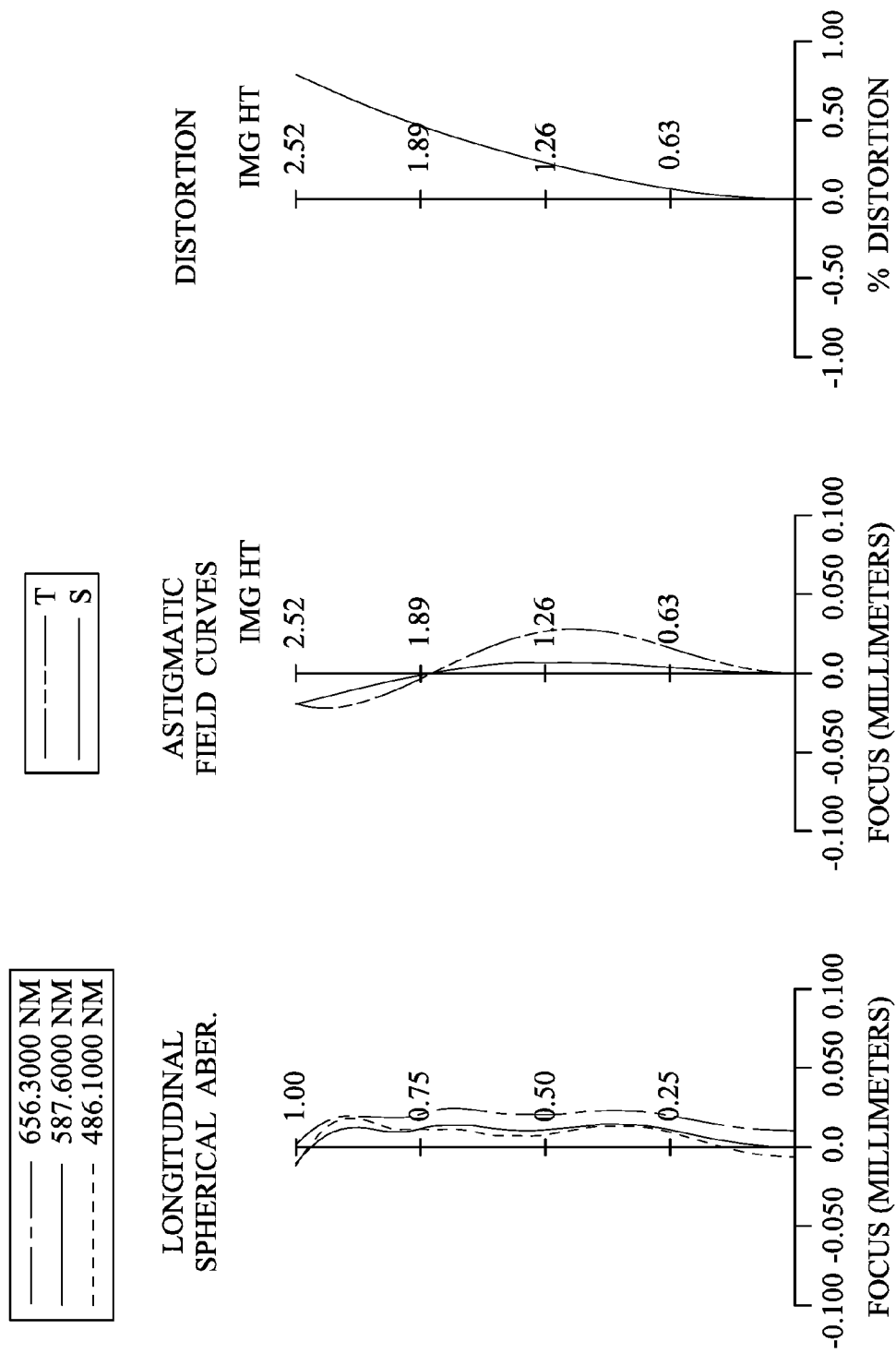
FIG. 10 is a schematic view of the optical photographing assembly according to the 1st embodiment of FIG. 1A which include different shapes and arrangements of the prisms.

Furthermore, FIG. 1B and FIG. 10 are schematic views of the optical photographing assembly according to the 1st embodiment of FIG. 1A which include different shapes and arrangements of the prisms 180, 190, respectively. In FIG. 1B and FIG. 10, the optical data of the prisms 180, 190 are the same as the optical data in Table 1, wherein the differences between FIG. 1A and FIG. 1B or FIG. 1A and FIG. 10 are the shapes and arrangements of the prisms 180, 190 so as to change the directions of the incident light of the optical photographing assembly and the outgoing light which is for imaging on the image surface 170. Therefore, it is favorable for applying to various image capturing apparatuses or electronic devices. Moreover, In FIG. 1B, an incident light through the object-side reflective element (prism 180) into the optical photographing assembly and the outgoing light through the image-side reflective element (prism 190) are on the same side of the optical axis of the lens elements.

2nd Embodiment

Figure 3A:
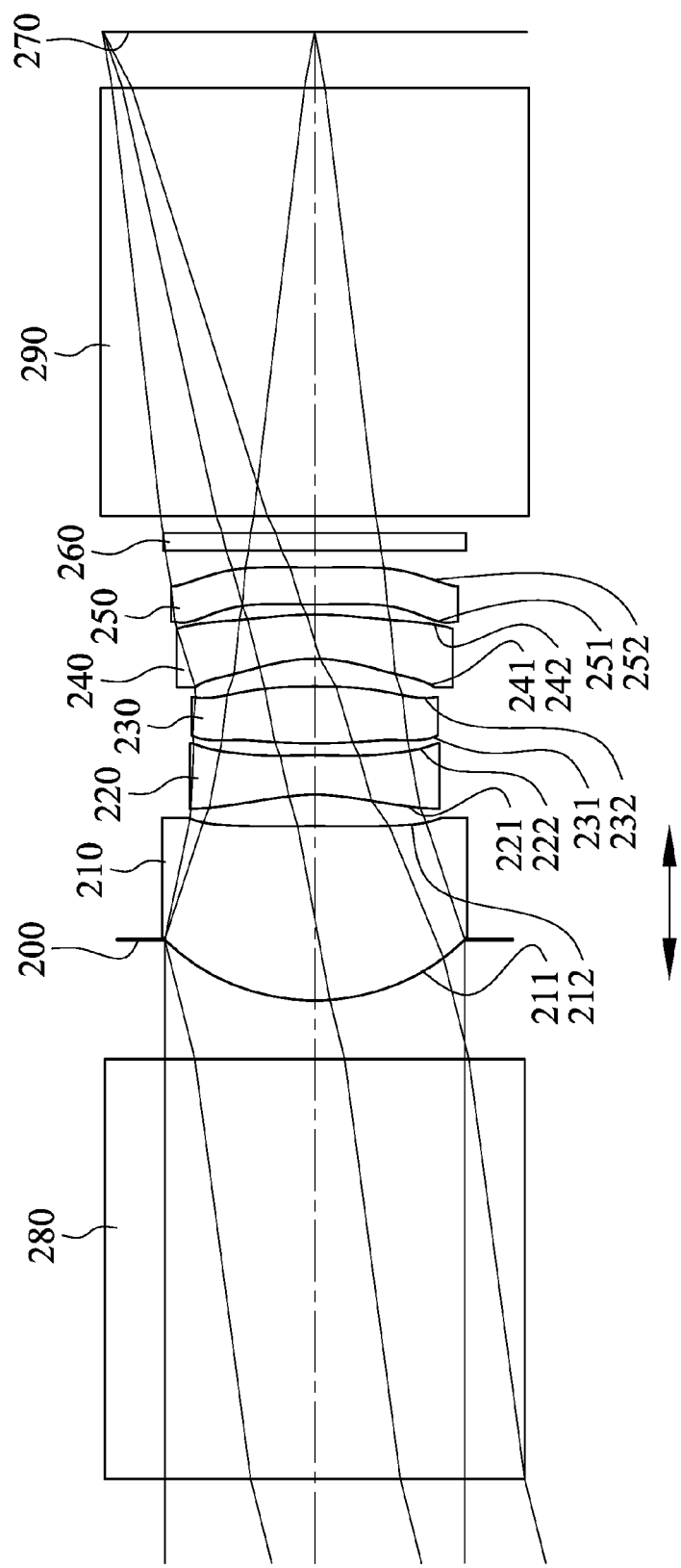
FIG. 3A is a schematic view of an optical photographing assembly according to the 2nd embodiment of the present disclosure.
Figure 4A:
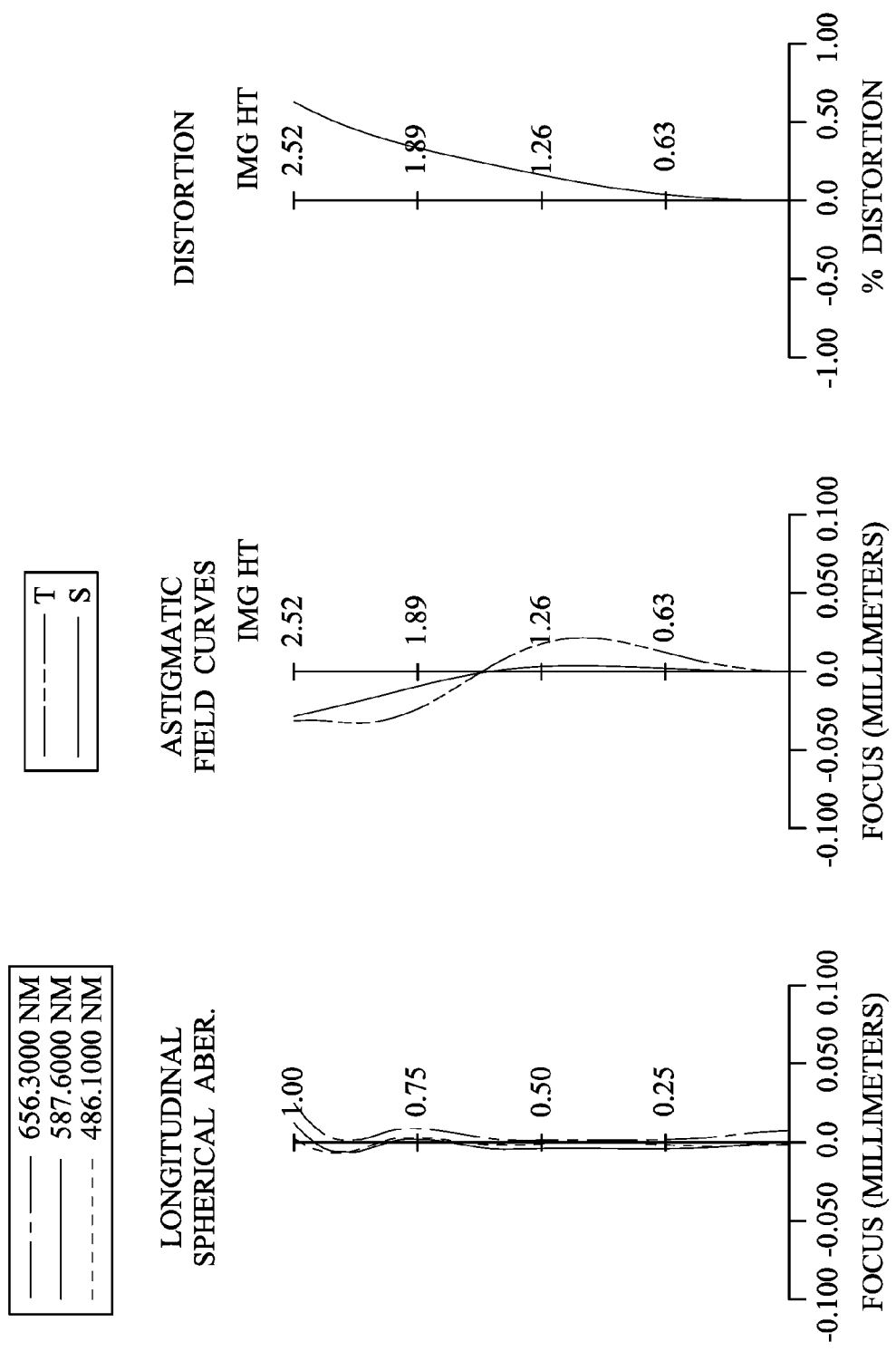
FIG. 4A shows spherical aberration curves, astigmatic field curves and a distortion curve of the optical photographing assembly when an object distance thereof is infinite according to the 2nd embodiment.
Figure 4B:
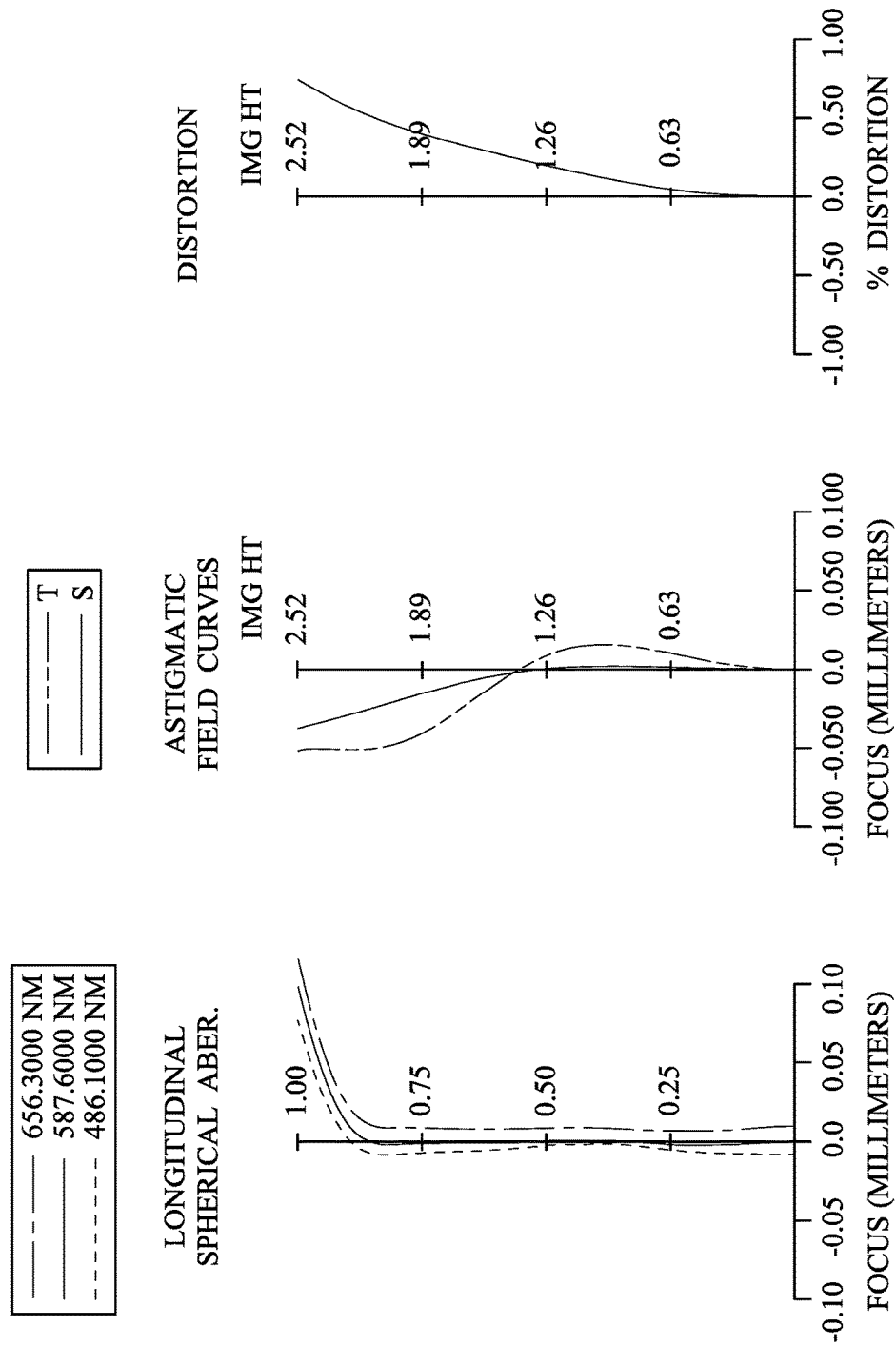
FIG. 4B shows spherical aberration curves, astigmatic field curves and a distortion curve of the optical photographing assembly when the object distance thereof is 400 mm according to the 2nd embodiment.

FIG. 3A is a schematic view of an optical photographing assembly according to the 2nd embodiment of the present disclosure. FIG. 4A shows spherical aberration curves, astigmatic field curves and a distortion curve of the optical photographing assembly when an object distance thereof is infinite according to the 2nd embodiment. FIG. 4B shows spherical aberration curves, astigmatic field curves and a distortion curve of the optical photographing assembly when the object distance thereof is 400 mm according to the 2nd embodiment. In FIG. 3A, the optical photographing assembly includes, in order from an object side to an image side, a prism 280, an aperture stop 200, a first lens element 210, a second lens element 220, a third lens element 230, a fourth lens element 240, a fifth lens element 250, a filter 260, a prism 290 and an image surface 270. The optical photographing assembly has a total of five lens elements (210-250), and there is an air space between every two lens elements of the first lens element 210, the second lens element 220, the third lens element 230, the fourth lens element 240 and the fifth lens element 250 that are adjacent to each other.

The first lens element 210 with positive refractive power has an object-side surface 211 being convex and an image-side surface 212 being convex. The first lens element 210 is made of a plastic material, and has the object-side surface 211 and the image-side surface 212 being both aspheric. In the 2nd embodiment, the first lens element 210 is a movable focusing lens element, and there is a relative displacement between the first lens element 210 and the second lens element 220. In FIG. 3A, the symbol of double arrow under the first lens element 210 means that the first lens element 210 can be moved relative to the second lens element 220 along the optical axis. It is relatively stationary between every two of the second lens element 220, the third lens element 230, the fourth lens element 240 and the fifth lens element 250.

The second lens element 220 with negative refractive power has an object-side surface 221 being concave and an image-side surface 222 being convex. The second lens element 220 is made of a plastic material, and has the object-side surface 221 and the image-side surface 222 being both aspheric.

The third lens element 230 with positive refractive power has an object-side surface 231 being convex and an image-side surface 232 being convex. The third lens element 230 is made of a plastic material, and has the object-side surface 231 and the image-side surface 232 being both aspheric.

The fourth lens element 240 with negative refractive power has an object-side surface 241 being concave and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being convex and an image-side surface 252 being concave. The fifth lens element 250 is made of a plastic material, and has the object-side surface 251 and the image-side surface 252 being both aspheric. Furthermore, both of the object-side surface 251 and the image-side surface 252 of the fifth lens element 250 include at least one inflection point.

The filter 260 is made of a glass material and located between the fifth lens element 250 and the image surface 270, and will not affect the focal length of the optical photographing assembly.

In the optical photographing assembly according to the 2nd embodiment, the optical photographing assembly includes two prisms 280, 290 which are made of glass materials. The prism 280 can be an object-side reflective element located between an imaged object (its reference numeral is omitted) and the aperture stop 200 on an optical path (which is located on an optical axis of the optical photographing assembly according to the 2nd embodiment). The prism 290 can be an image-side reflective element located between the filter 260 and the image surface 270 on the optical path (which is located on the optical axis of the optical photographing assembly according to the 2nd embodiment).

The detailed optical data of the 2nd embodiment are shown in Table 3 and the aspheric surface data are shown in Table 4 below.

TABLE 3

2nd Embodiment
f = 10.00 mm/9.79 mm, Fno = 2.80, HFOV = 14.1 deg./13.9 deg.

| Surface # | | Curvature Radius | | Thickness Position 1 | Position2 | Material | Index | Abbe # | Focal Length |
|---|---|---|---|---|---|---|---|---|---|
| 0 | Object | Plano | | Infinity | 400.000 | | | | |
| 1 | Prism | Plano | | 5.000 | | Glass | 1.847 | 23.8 | — |
| 2 | | Plano | | 1.426 | | | | | |
| 3 | Ape. Stop | Plano | | −0.726 | | | | | |
| 4 | Lens 1 | 2.608 | ASP | 2.077 | | Plastic | 1.544 | 55.9 | 4.60 |
| 5 | | −43.274 | ASP | 0.375 | 0.428 | | | | |
| 6 | Lens 2 | −2.113 | ASP | 0.468 | | Plastic | 1.660 | 20.4 | −5.22 |
| 7 | | −5.950 | ASP | 0.141 | | | | | |
| 8 | Lens 3 | 8.592 | ASP | 0.679 | | Plastic | 1.660 | 20.4 | 6.72 |
| 9 | | −8.871 | ASP | 0.329 | | | | | |
| 10 | Lens 4 | −1.908 | ASP | 0.529 | | Plastic | 1.615 | 26.0 | −6.69 |
| 11 | | −3.935 | ASP | 0.118 | | | | | |
| 12 | Lens 5 | 11.858 | ASP | 0.442 | | Plastic | 1.544 | 55.9 | 84.15 |
| 13 | | 15.796 | ASP | 0.200 | | | | | |
| 14 | Filter | Plano | | 0.210 | | Glass | 1.517 | 64.2 | — |
| 15 | | Plano | | 0.200 | | | | | |
| 16 | Prism | Plano | | 5.100 | | Glass | 1.517 | 64.2 | — |
| 17 | | Plano | | 0.667 | | | | | |
| 18 | Image | Plano | | — | | | | | |

Reference wavelength is 587.6 nm (d-line).
Both of Prisms (280, 290) have reflective surface.
Both of f and HFOV include data under the object distance being infinite and 400 mm.

TABLE 4

Aspheric Coefficients

| Surface # | 4 | 5 | 6 | 7 | 8 |
|---|---|---|---|---|---|
| k = | 3.2369E−01 | 9.9000E+01 | −1.3081E+01 | −4.6138E+01 | 2.7888E+01 |
| A4 = | −2.2324E−03 | 1.9004E−02 | 7.5068E−02 | 2.8469E−01 | 7.8784E−02 |
| A6 = | 1.1254E−04 | −1.4428E−03 | −6.2372E−02 | −3.6842E−01 | −2.3684E−01 |
| A8 = | −1.9369E−04 | 6.0405E−04 | 2.9471E−02 | 3.0495E−01 | 2.2073E−01 |
| A10 = | 4.8890E−05 | −1.9373E−04 | −6.4473E−03 | −1.7173E−01 | −1.2780E−01 |
| A12 = | −5.6958E−06 | 2.9910E−04 | 5.0905E−04 | 5.9366E−02 | 4.6476E−02 |
| A14 = | | | | −8.8332E−03 | −7.1898E−03 |

| Surface # | 9 | 10 | 11 | 12 | 13 |
|---|---|---|---|---|---|
| k = | 3.0396E+01 | −3.5850E+00 | −1.3708E+01 | −8.1028E+00 | 7.2976E+01 |
| A4 = | −5.6339E−02 | 2.2869E−02 | 3.1945E−02 | −1.0860E−01 | −8.6809E−02 |
| A6 = | −1.2101E−03 | −3.3768E−03 | 4.0545E−02 | 6.9059E−02 | 3.5208E−02 |
| A8 = | 3.6543E−02 | 5.1575E−02 | −6.4039E−02 | −8.3131E−02 | −2.8802E−02 |
| A10 = | −6.2712E−03 | −5.0930E−02 | 3.4189E−02 | 4.9523E−02 | 1.6372E−02 |
| A12 = | −6.9518E−03 | 1.8432E−02 | −8.6884E−03 | −1.2168E−02 | −4.4883E−03 |
| A14 = | 2.5174E−03 | −2.8196E−03 | 8.6650E−04 | 1.0877E−03 | 4.9911E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again. Further, one condition with two data refers to, from left to right, under the object distance being infinite and 400 mm, respectively.

According to the 2nd embodiment, the first lens element 210 is a movable focusing lens element. When an axial distance between the first lens element 210 and the second lens element 220 with an object distance at infinity is T12i, an axial distance between the first lens element 210 and the second lens element 220 with the object distance at 400 mm is T12m, and the condition "T12i/T12m" satisfies the following data.

Moreover, these parameters can be calculated from Table 3 and Table 4 as the following values and satisfy the following conditions:

| 2nd Embodiment | | | |
|---|---|---|---|
| f [mm] | 10.00/9.79 | ΣCT/ΣAT | 4.36/4.13 |
| Fno. | 2.80 | f/ImgH | 3.97/3.89 |
| HFOV [deg.] | 14.1/13.9 | f/TD | 1.94/1.88 |
| V2 | 20.4 | SD/TD | 0.86/0.86 |
| V3 | 20.4 | BL/TD | 1.24/1.22 |
| V4 | 26.0 | TD/TP1 | 1.03/1.04 |
| tan(FOV) | 0.54/0.53 | TD/TP2 | 1.01/1.02 |
| T23/CT1 | 0.07 | Yo/Yi | 1.05/1.06 |
| (R3 − R4)/(R3 + R4) | −0.48 | Ymax/Ymin | 1.26/1.28 |
| (R5 + R6)/(R5 − R6) | −0.02 | VRO | 23.8 |
| f/R7 | −5.24/−5.13 | VRI | 64.2 |
| \|f1/f2\| | 0.88 | T12i/T12m | 0.88 |

-continued

| 2nd Embodiment | | | |
|---|---|---|---|
| f/f4 | −1.49/−1.46 | \|Dr1s/Dr2s\| | 0.54 |
| f/f5 | 0.12/0.12 | (WPO + WPI)/f | 1.01/1.03 |
| \|f/f1\| + \|f/f2\| | 4.09/4.01 | DP/(WPO + WPI) | 0.64/0.65 |
| CT1/(ΣCT − CT1) | 0.98 | | |

Figure 3B:
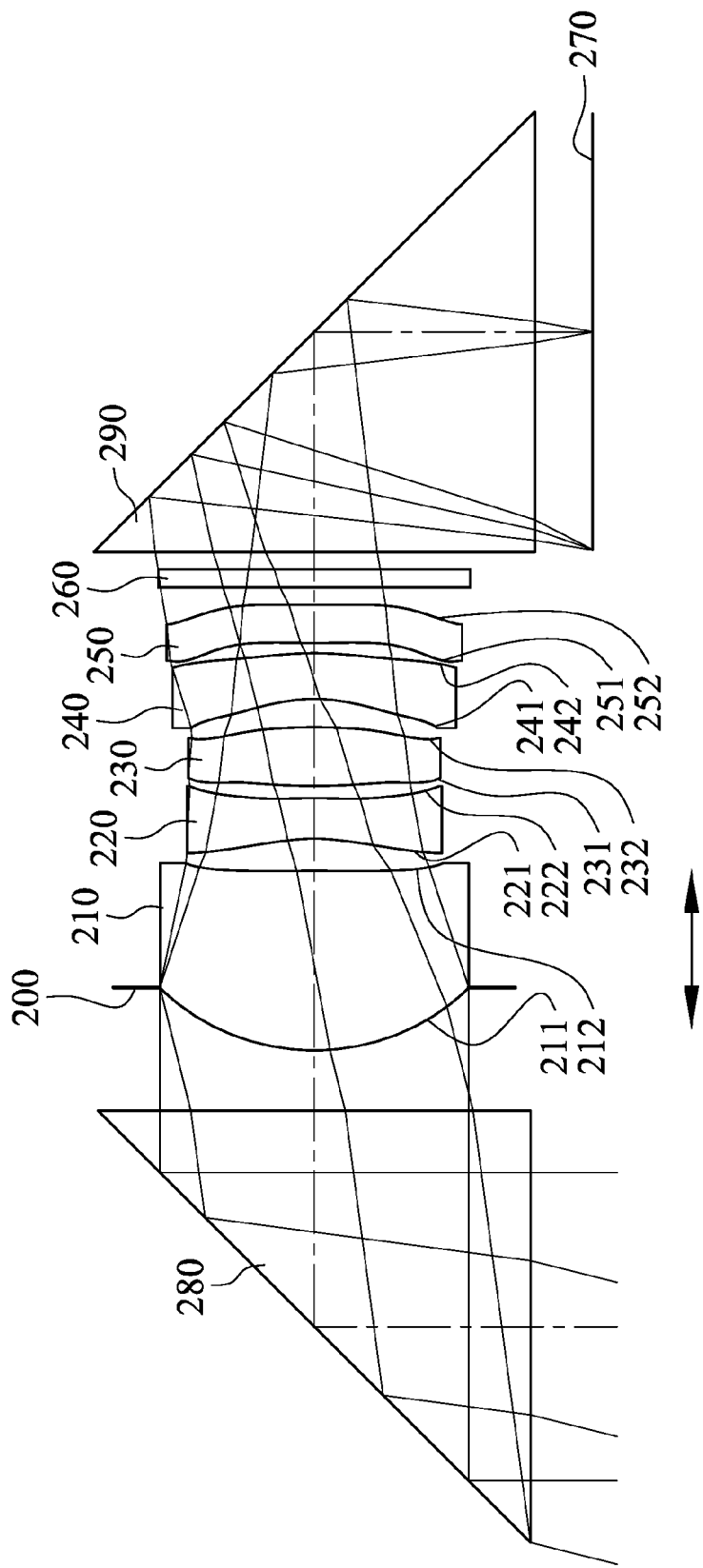
FIG. 3B is a schematic view of the optical photographing assembly according to the 2nd embodiment of FIG. 3A which include different shapes and arrangements of the prisms.
Figure 3C:
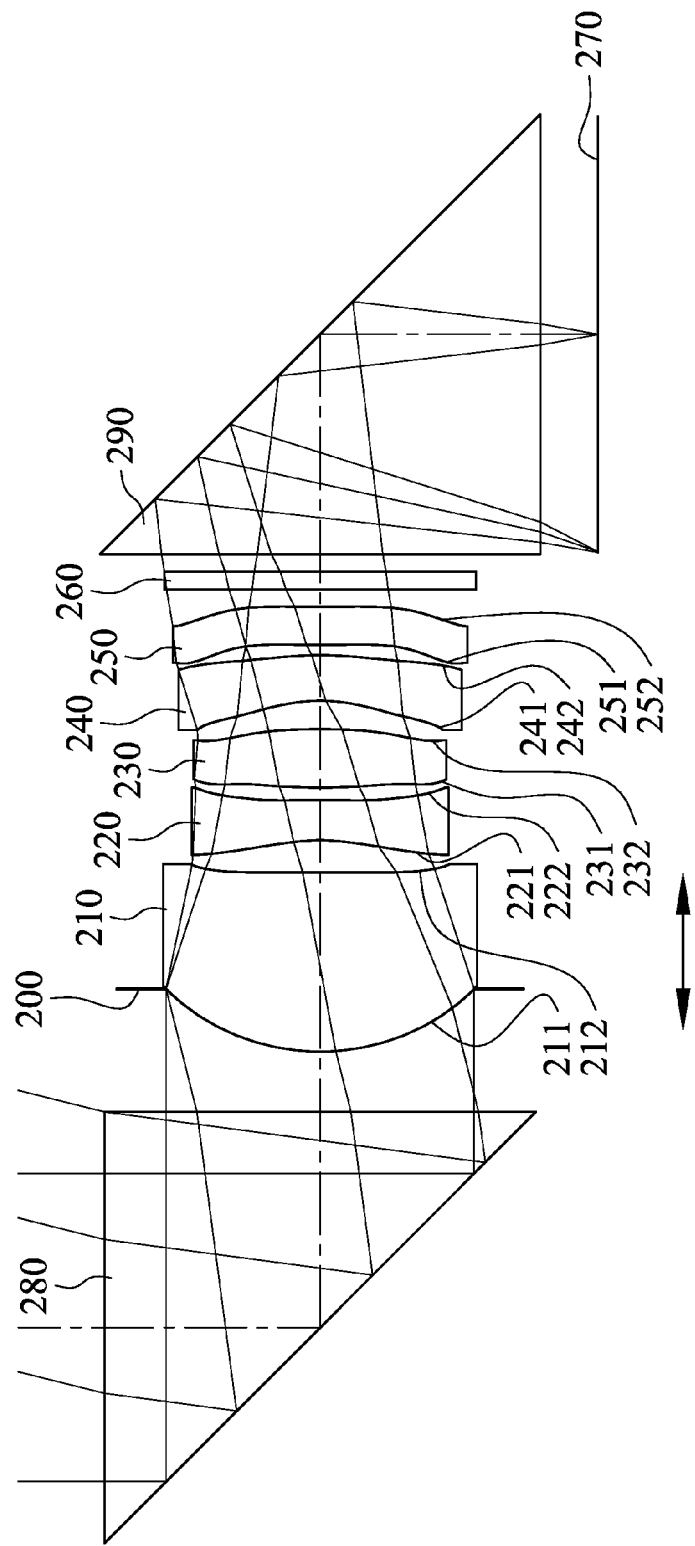
FIG. 3C is a schematic view of the optical photographing assembly according to the 2nd embodiment of FIG. 3A which include different shapes and arrangements of the prisms.

Furthermore, FIG. 3B and FIG. 3C are schematic views of the optical photographing assembly according to the 2nd embodiment of FIG. 3A which include different shapes and arrangements of the prisms 280, 290, respectively. In FIG. 3B and FIG. 3C, the optical data of the prisms 280, 290 are the same as the optical data in Table 3, wherein the differences between FIG. 3A and FIG. 3B or FIG. 3A and FIG. 3C are the shapes and arrangements of the prisms 280, 290 so as to change the directions of the incident light of the optical photographing assembly and the outgoing light which is for imaging on the image surface 270. Therefore, it is favorable for applying to various image capturing apparatuses or electronic devices. Moreover, In FIG. 3B, an incident light through the object-side reflective element (prism 280) into the optical photographing assembly and the outgoing light through the image-side reflective element (prism 290) are on the same side of the optical axis of the lens elements.

3rd Embodiment

Figure 5A:
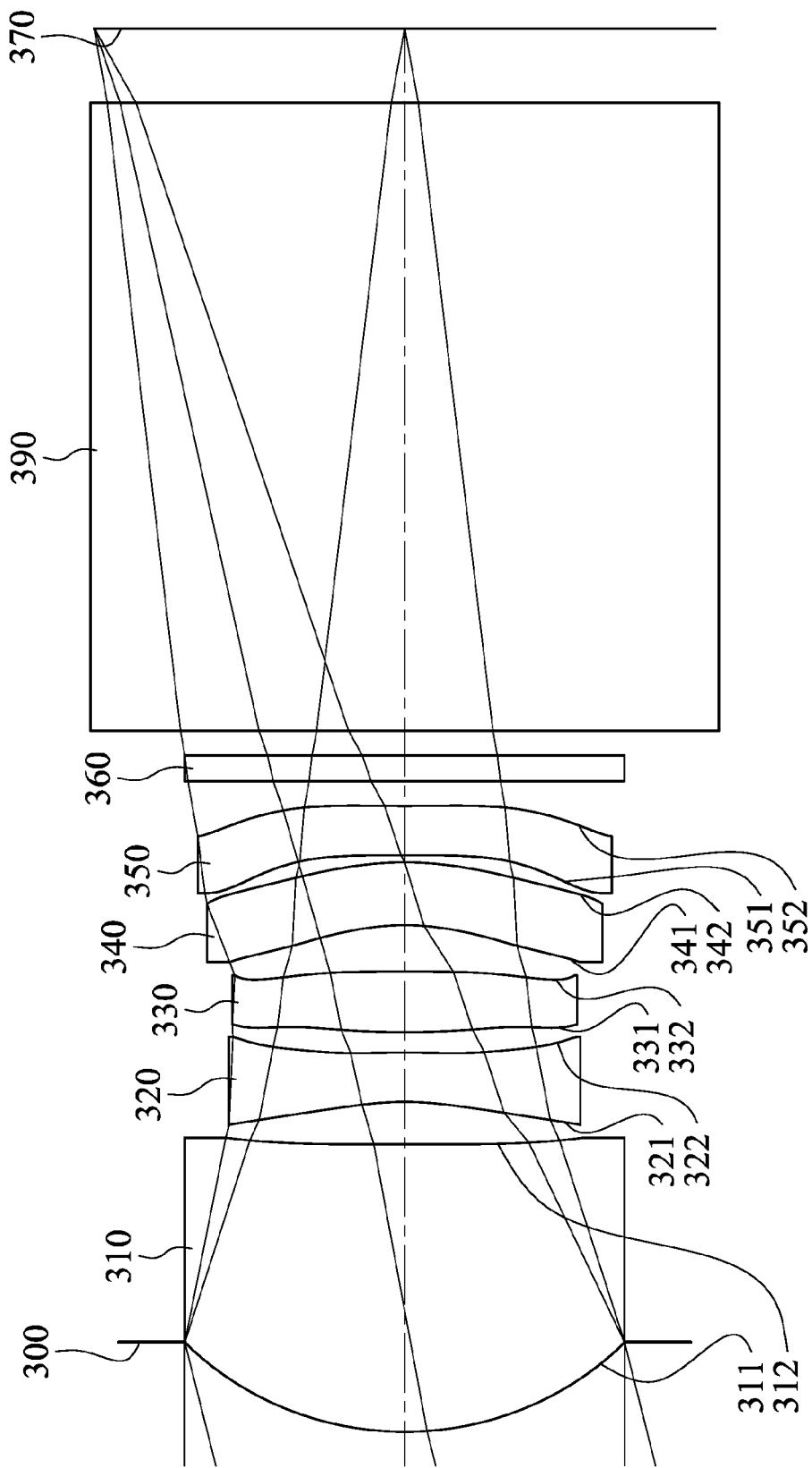
FIG. 5A is a schematic view of an optical photographing assembly according to the 3rd embodiment of the present disclosure.
Figure 6:
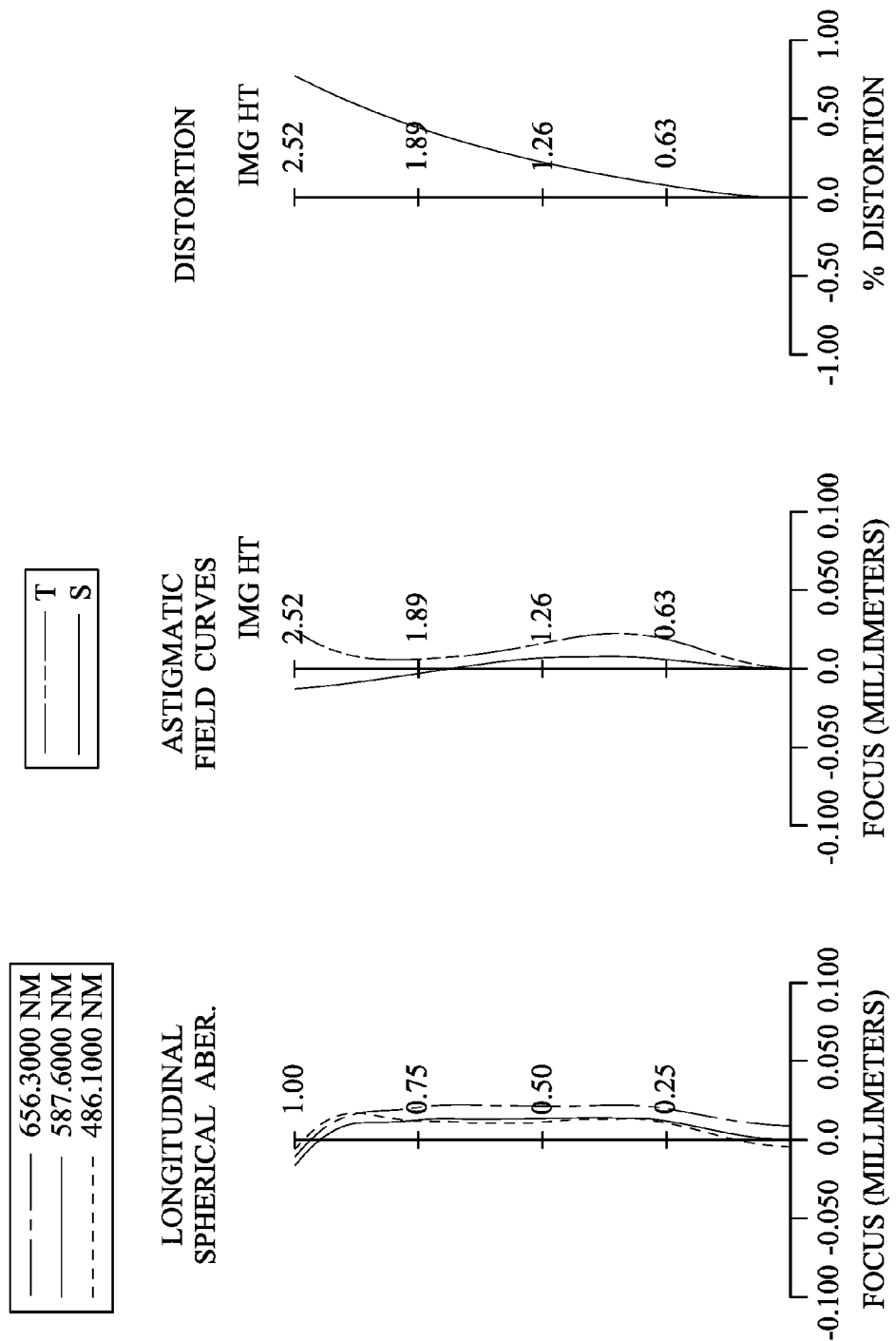
FIG. 6 shows spherical aberration curves, astigmatic field curves and a distortion curve of the optical photographing assembly according to the 3rd embodiment.

FIG. 5A is a schematic view of an optical photographing assembly according to the 3rd embodiment of the present disclosure. FIG. 6 shows spherical aberration curves, astigmatic field curves and a distortion curve of the optical photographing assembly according to the 3rd embodiment. In FIG. 5A, the optical photographing assembly includes, in order from an object side to an image side, an aperture stop 300, a first lens element 310, a second lens element 320, a third lens element 330, a fourth lens element 340, a fifth lens element 350, a filter 360, a prism 390 and an image surface 370. The optical photographing assembly has a total of five lens elements (310-350), and there is an air space between every two lens elements of the first lens element 310, the second lens element 320, the third lens element 330, the fourth lens element 340 and the fifth lens element 350 that are adjacent to each other.

The first lens element 310 with positive refractive power has an object-side surface 311 being convex and an image-side surface 312 being convex. The first lens element 310 is made of a plastic material, and has the object-side surface 311 and the image-side surface 312 being both aspheric.

The second lens element 320 with negative refractive power has an object-side surface 321 being concave and an image-side surface 322 being convex. The second lens element 320 is made of a plastic material, and has the object-side surface 321 and the image-side surface 322 being both aspheric.

The third lens element 330 with positive refractive power has an object-side surface 331 being convex and an image-side surface 332 being convex. The third lens element 330 is made of a plastic material, and has the object-side surface 331 and the image-side surface 332 being both aspheric.

The fourth lens element 340 with negative refractive power has an object-side surface 341 being concave and an image-side surface 342 being convex in a paraxial region thereof. The fourth lens element 340 is made of a plastic material, and has the object-side surface 341 and the image-side surface 342 being both aspheric.

The fifth lens element 350 with negative refractive power has an object-side surface 351 being convex and an image-side surface 352 being concave. The fifth lens element 350 is made of a plastic material, and has the object-side surface 351 and the image-side surface 352 being both aspheric. Furthermore, both of the object-side surface 351 and the image-side surface 352 of the fifth lens element 350 include at least one inflection point.

The filter 360 is made of a glass material and located between the fifth lens element 350 and the image surface 370, and will not affect the focal length of the optical photographing assembly.

In the optical photographing assembly according to the 3rd embodiment, the optical photographing assembly includes the prism 390 which is made of a glass material. The prism 390 can be an image-side reflective element located between the filter 360 and the image surface 370 on the optical path (which is located on the optical axis of the optical photographing assembly according to the 3rd embodiment).

The detailed optical data of the 3rd embodiment are shown in Table 5 and the aspheric surface data are shown in Table 6 below.

TABLE 5

3rd Embodiment
f = 10.00 mm, Fno = 2.80, HFOV = 14.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.727 | | | | |
| 2 | Lens 1 | 2.583 | ASP | 2.335 | Plastic | 1.544 | 55.9 | 4.70 |
| 3 | | −175.942 | ASP | 0.346 | | | | |
| 4 | Lens 2 | −2.232 | ASP | 0.400 | Plastic | 1.660 | 20.4 | −5.41 |
| 5 | | −6.368 | ASP | 0.165 | | | | |
| 6 | Lens 3 | 9.730 | ASP | 0.494 | Plastic | 1.660 | 20.4 | 9.85 |
| 7 | | −19.220 | ASP | 0.375 | | | | |
| 8 | Lens 4 | −2.008 | ASP | 0.511 | Plastic | 1.660 | 20.4 | −17.67 |
| 9 | | −2.671 | ASP | 0.057 | | | | |
| 10 | Lens 5 | 95.590 | ASP | 0.400 | Plastic | 1.544 | 55.9 | −31.91 |
| 11 | | 14.661 | ASP | 0.200 | | | | |
| 12 | Filter | Plano | | 0.210 | Glass | 1.517 | 64.2 | — |
| 13 | | Plano | | 0.200 | | | | |
| 14 | Prism | Plano | | 5.100 | Glass | 1.517 | 64.2 | — |

TABLE 5-continued

3rd Embodiment
f = 10.00 mm, Fno = 2.80, HFOV = 14.1 deg.

| Surface # | | Curvature Radius | Thickness | Material | Index | Abbe # | Focal Length |
|---|---|---|---|---|---|---|---|
| 15 | | Plano | 0.605 | | | | |
| 16 | Image | Plano | — | | | | |

Reference wavelength is 587.6 nm (d-line).
Prism (390) has reflective surface.

TABLE 6

Aspheric Coefficients

| Surface # | 2 | 3 | 4 | 5 | 6 |
|---|---|---|---|---|---|
| k = | 3.4365E−01 | −9.9000E+01 | −1.3577E+01 | −5.6125E+01 | 2.8814E+01 |
| A4 = | −2.3887E−03 | 2.2264E−02 | 1.0524E−01 | 3.2089E−01 | 1.3280E−01 |
| A6 = | 1.2932E−05 | −9.0703E−04 | −1.2145E−01 | −4.7020E−01 | −3.5569E−01 |
| A8 = | −2.8993E−04 | −1.2118E−02 | 6.5451E−02 | 4.2664E−01 | 3.8286E−01 |
| A10 = | 7.6825E−05 | 8.9939E−03 | −1.4092E−02 | −2.6340E−01 | −2.6949E−01 |
| A12 = | −1.4469E−05 | −1.8870E−03 | 4.2756E−04 | 1.0189E−01 | 1.1273E−01 |
| A14 = | | | | −1.7223E−02 | −1.9250E−02 |

| Surface # | 7 | 8 | 9 | 10 | 11 |
|---|---|---|---|---|---|
| k = | 4.1023E+01 | −3.2155E+00 | −1.8979E+00 | 8.9439E+01 | 7.2076E+01 |
| A4 = | 7.4403E−03 | 6.1164E−02 | 3.1725E−02 | −1.4698E−01 | −1.1214E−01 |
| A6 = | −1.1714E−01 | −1.4157E−01 | −1.7387E−02 | 1.0666E−01 | 6.5071E−02 |
| A8 = | 1.2701E−01 | 2.1595E−01 | 3.2344E−02 | −8.9684E−02 | −4.6684E−02 |
| A10 = | −3.9988E−02 | −1.4170E−01 | −2.8165E−02 | 4.1819E−02 | 2.2430E−02 |
| A12 = | −5.3049E−03 | 4.2022E−02 | 1.0910E−02 | −7.7463E−03 | −5.6644E−03 |
| A14 = | 4.2574E−03 | −4.7881E−03 | −1.6218E−03 | 3.9728E−04 | 5.8335E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 10.00 | ΣCT/ΣAT | 4.39 |
| Fno | 2.80 | f/ImgH | 3.97 |
| HFOV [deg.] | 14.1 | f/TD | 1.97 |
| V2 | 20.4 | SD/TD | 0.86 |
| V3 | 20.4 | BL/TD | 1.24 |
| V4 | 20.4 | TD/TP1 | — |
| tan(FOV) | 0.54 | TD/TP2 | 1.00 |
| T23/CT1 | 0.07 | Yo/Yi | 1.06 |
| (R3 − R4)/(R3 + R4) | −0.48 | Ymax/Ymin | 1.29 |
| (R5 + R6)/(R5 − R6) | −0.33 | VRO | — |
| f/R7 | −4.98 | VRI | 64.2 |
| |f1/f2| | 0.87 | T12i/T12m | — |
| f/f4 | −0.57 | |Dr1s/Dr2s| | 0.45 |
| f/f5 | −0.31 | (WPO + WPI)/f | — |
| |f/f1| + |f/f2| | 3.97 | DP/(WPO + WPI) | — |
| CT1/(ΣCT − CT1) | 1.29 | | |

Figure 5B:
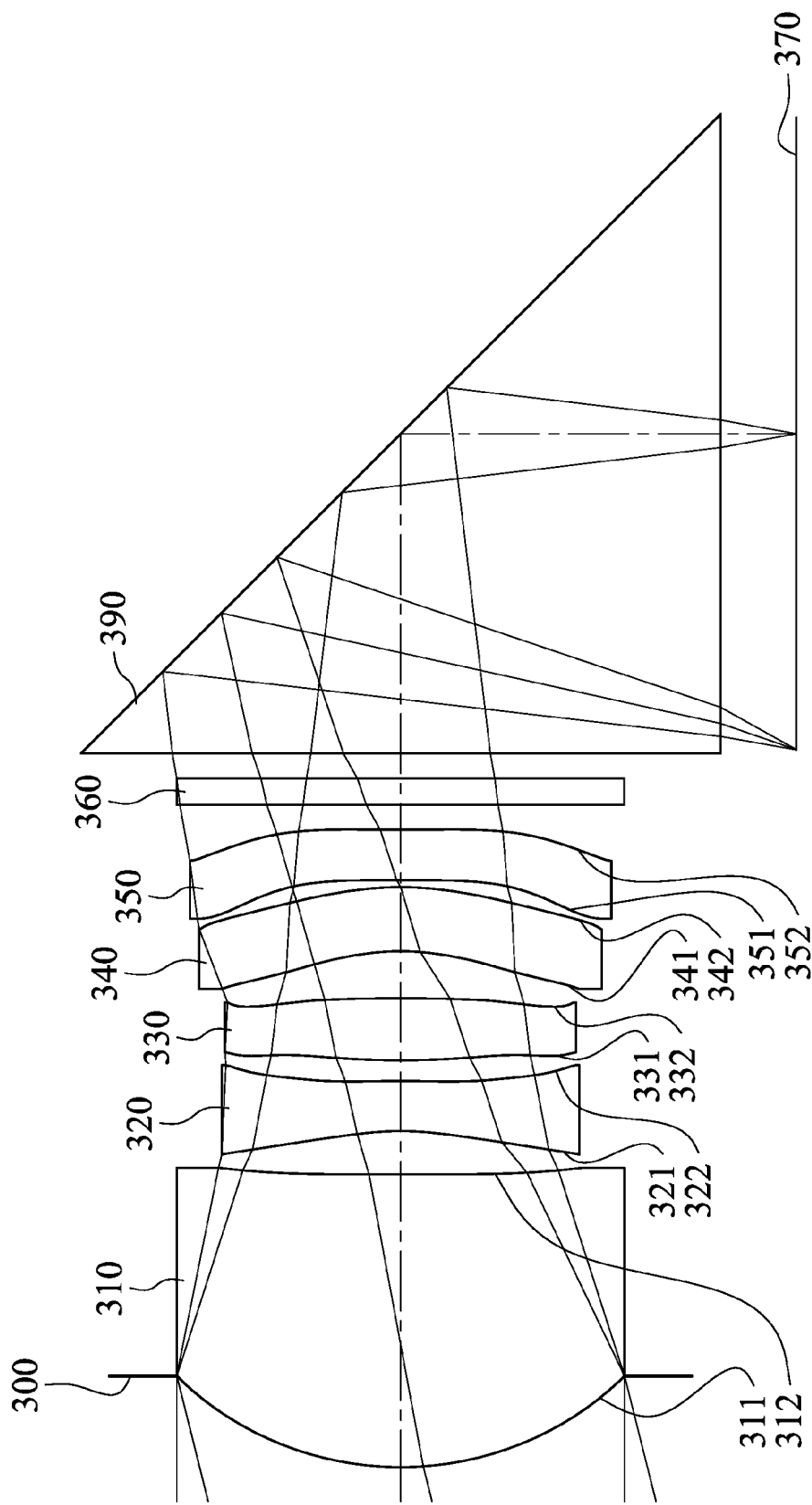
FIG. 5B is a schematic view of the optical photographing assembly according to the 3rd embodiment of FIG. 5A which includes different shapes and arrangements of the prism.

Furthermore, FIG. 5B is a schematic view of the optical photographing assembly according to the 3rd embodiment of FIG. 5A which includes different shapes and arrangements of the prism 390. In FIG. 5B, the optical data of the prism 390 are the same as the optical data in Table 5, wherein the differences between FIG. 5A and FIG. 5B are the shapes and arrangements of the prism 390 so as to change the directions of the incident light of the optical photographing assembly and the outgoing light which is for imaging on the image surface 370. Therefore, it is favorable for applying to various image capturing apparatuses or electronic devices.

4th Embodiment

Figure 7:
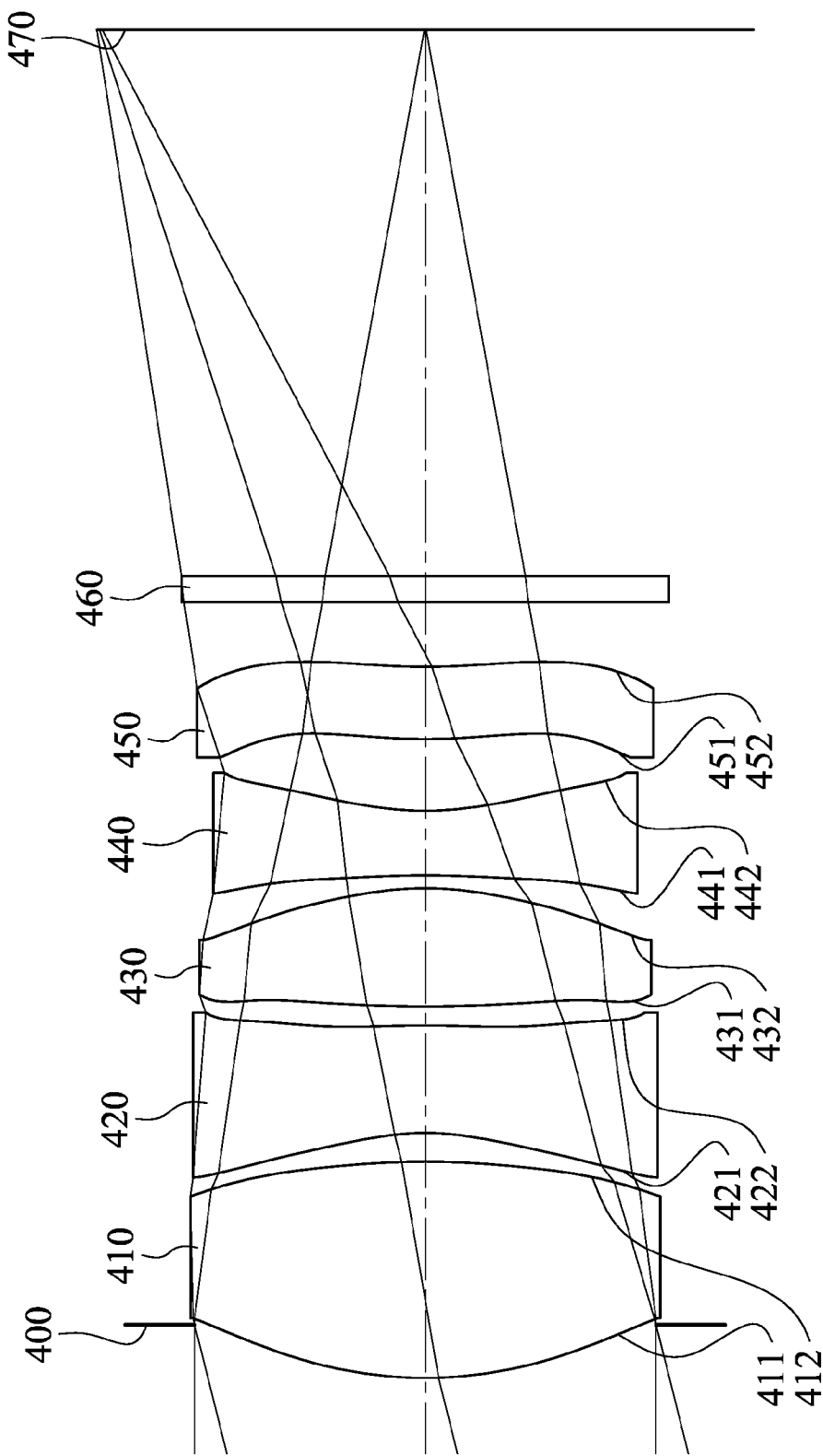
FIG. 7 is a schematic view of an optical photographing assembly according to the 4th embodiment of the present disclosure.
Figure 8:
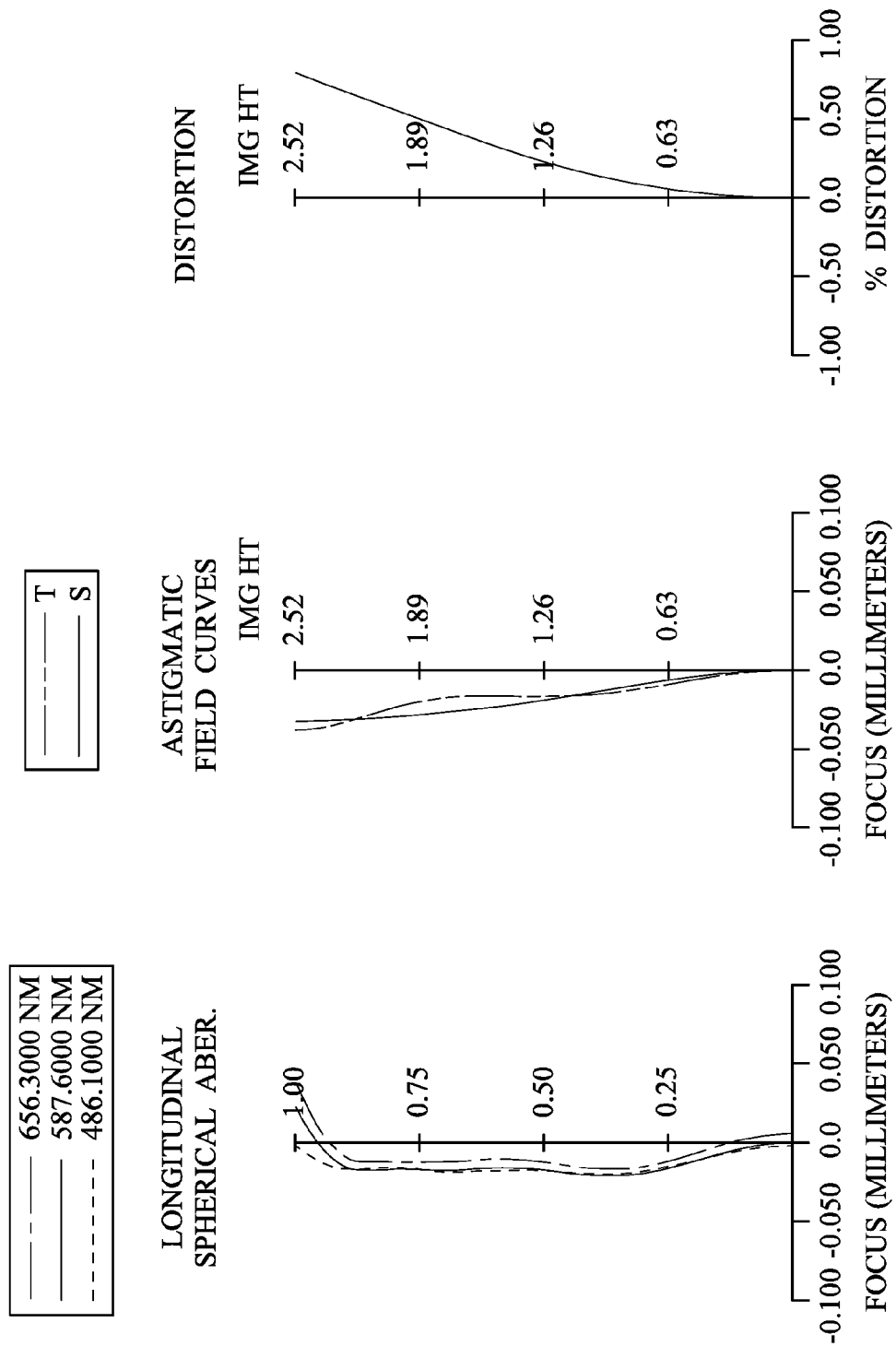
FIG. 8 shows spherical aberration curves, astigmatic field curves and a distortion curve of the optical photographing assembly according to the 4th embodiment.

FIG. 7 is a schematic view of an optical photographing assembly according to the 4th embodiment of the present disclosure. FIG. 8 shows spherical aberration curves, astigmatic field curves and a distortion curve of the optical photographing assembly according to the 4th embodiment. In FIG. 7, the optical photographing assembly includes, in order from an object side to an image side, an aperture stop 400, a first lens element 410, a second lens element 420, a third lens element 430, a fourth lens element 440, a fifth lens element 450, a filter 460 and an image surface 470. The optical photographing assembly has a total of five lens elements (410-450), and there is an air space between every two lens elements of the first lens element 410, the second lens element 420, the third lens element 430, the fourth lens element 440 and the fifth lens element 450 that are adjacent to each other.

The first lens element 410 with positive refractive power has an object-side surface 411 being convex and an image-side surface 412 being convex. The first lens element 410 is made of a plastic material, and has the object-side surface 411 and the image-side surface 412 being both aspheric.

The second lens element 420 with negative refractive power has an object-side surface 421 being concave and an image-side surface 422 being convex. The second lens element 420 is made of a plastic material, and has the object-side surface 421 and the image-side surface 422 being both aspheric.

The third lens element 430 with positive refractive power has an object-side surface 431 being convex and an image-side surface 432 being convex. The third lens element 430 is made of a plastic material, and has the object-side surface 431 and the image-side surface 432 being both aspheric.

The fourth lens element 440 with negative refractive power has an object-side surface 441 being concave and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being convex and an image-side surface 452 being concave. The fifth lens element 450 is made of a plastic material, and has the object-side surface 451 and the image-side surface 452 being both aspheric. Furthermore, both of the object-side surface 451 and the image-side surface 452 of the fifth lens element 450 include at least one inflection point.

The filter 460 is made of a glass material and located between the fifth lens element 450 and the image surface 470, and will not affect the focal length of the optical photographing assembly.

The detailed optical data of the 4th embodiment are shown in Table 7 and the aspheric surface data are shown in Table 8 below.

TABLE 7

4th Embodiment
f = 10.00 mm, Fno = 2.80, HFOV = 14.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.413 | | | | |
| 2 | Lens 1 | 3.202 | ASP | 1.676 | Plastic | 1.544 | 55.9 | 4.00 |
| 3 | | −5.549 | ASP | 0.222 | | | | |
| 4 | Lens 2 | −1.975 | ASP | 0.832 | Plastic | 1.639 | 23.5 | −4.45 |
| 5 | | −7.515 | ASP | 0.148 | | | | |
| 6 | Lens 3 | 10.730 | ASP | 0.915 | Plastic | 1.660 | 20.4 | 3.22 |
| 7 | | −2.561 | ASP | 0.100 | | | | |
| 8 | Lens 4 | −6.710 | ASP | 0.500 | Plastic | 1.639 | 23.5 | −2.80 |
| 9 | | 2.508 | ASP | 0.555 | | | | |
| 10 | Lens 5 | 4.237 | ASP | 0.561 | Plastic | 1.544 | 55.9 | 30.07 |
| 11 | | 5.453 | ASP | 0.500 | | | | |
| 12 | Filter | Plano | | 0.200 | Glass | 1.517 | 64.2 | — |
| 13 | | Plano | | 4.233 | | | | |
| 14 | Image | Plano | | — | | | | |

Reference wavelength is 587.6 nm (d-line).

TABLE 8

Aspheric Coefficients

| Surface # | 2 | 3 | 4 | 5 | 6 |
|---|---|---|---|---|---|
| k = | −7.5216E−01 | −1.5318E+00 | −7.7246E+00 | −9.9000E+01 | 2.7030E+01 |
| A4 = | −5.6388E−04 | 3.5825E−02 | 5.5410E−02 | 9.2546E−02 | −1.8601E−02 |
| A6 = | −8.7061E−04 | −2.3164E−02 | −3.8295E−02 | −2.3575E−02 | 3.2093E−02 |
| A8 = | −4.1063E−05 | 6.8588E−03 | 1.3530E−02 | −2.0280E−02 | −2.6895E−02 |
| A10 = | 1.7746E−05 | −1.4079E−03 | −2.8451E−03 | 1.2971E−02 | 3.2294E−03 |
| A12 = | −1.6361E−05 | 1.5797E−04 | 3.1215E−04 | −2.9750E−03 | 1.9362E−03 |
| A14 = | | | | 3.2115E−04 | −3.7463E−04 |

| Surface # | 7 | 8 | 9 | 10 | 11 |
|---|---|---|---|---|---|
| k = | −3.5899E+00 | −5.1682E+00 | −1.5545E+00 | −1.9541E+01 | 4.3337E+00 |
| A4 = | 2.5917E−02 | 6.7838E−02 | −4.6324E−02 | −5.1589E−02 | −6.2643E−02 |
| A6 = | 5.8681E−03 | −4.9099E−02 | −6.0584E−03 | −1.1974E−02 | 4.3553E−03 |
| A8 = | −2.0723E−02 | 1.2250E−02 | 1.2653E−02 | 7.5396E−03 | −7.8621E−04 |
| A10 = | 1.0425E−02 | −1.3325E−03 | −7.1867E−03 | −3.5774E−03 | 4.4819E−04 |
| A12 = | −2.2330E−03 | 1.5795E−04 | 1.7733E−03 | 9.0815E−04 | −8.8343E−05 |
| A14 = | 2.0654E−04 | | | | −4.0985E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 10.00 | ΣCT/ΣAT | 4.37 |
| Fno | 2.80 | f/I mgH | 3.97 |
| HFOV [deg.] | 14.1 | f/TD | 1.81 |
| V2 | 23.5 | SD/TD | 0.93 |
| V3 | 20.4 | BL/TD | 0.90 |
| V4 | 23.5 | TD/TP1 | — |
| tan(FOV) | 0.53 | TD/TP2 | — |
| T23/CT1 | 0.09 | Yo/Yi | 1.02 |
| (R3 − R4)/(R3 + R4) | −0.58 | Ymax/Ymin | 1.17 |
| (R5 + R6)/(R5 − R6) | 0.61 | VRO | — |
| f/R7 | −1.49 | VRI | — |
| |f1/f2| | 0.90 | T12i/T12m | — |
| f/f4 | −3.57 | |Dr1s/Dr2s| | 0.33 |
| f/f5 | 0.33 | (WPO + WPI)/f | — |
| |f/f1| + |f/f2| | 4.74 | DP/(WPO + WPI) | — |
| CT1/(ΣCT − CT1) | 0.60 | | |

5th Embodiment

Figure 9:
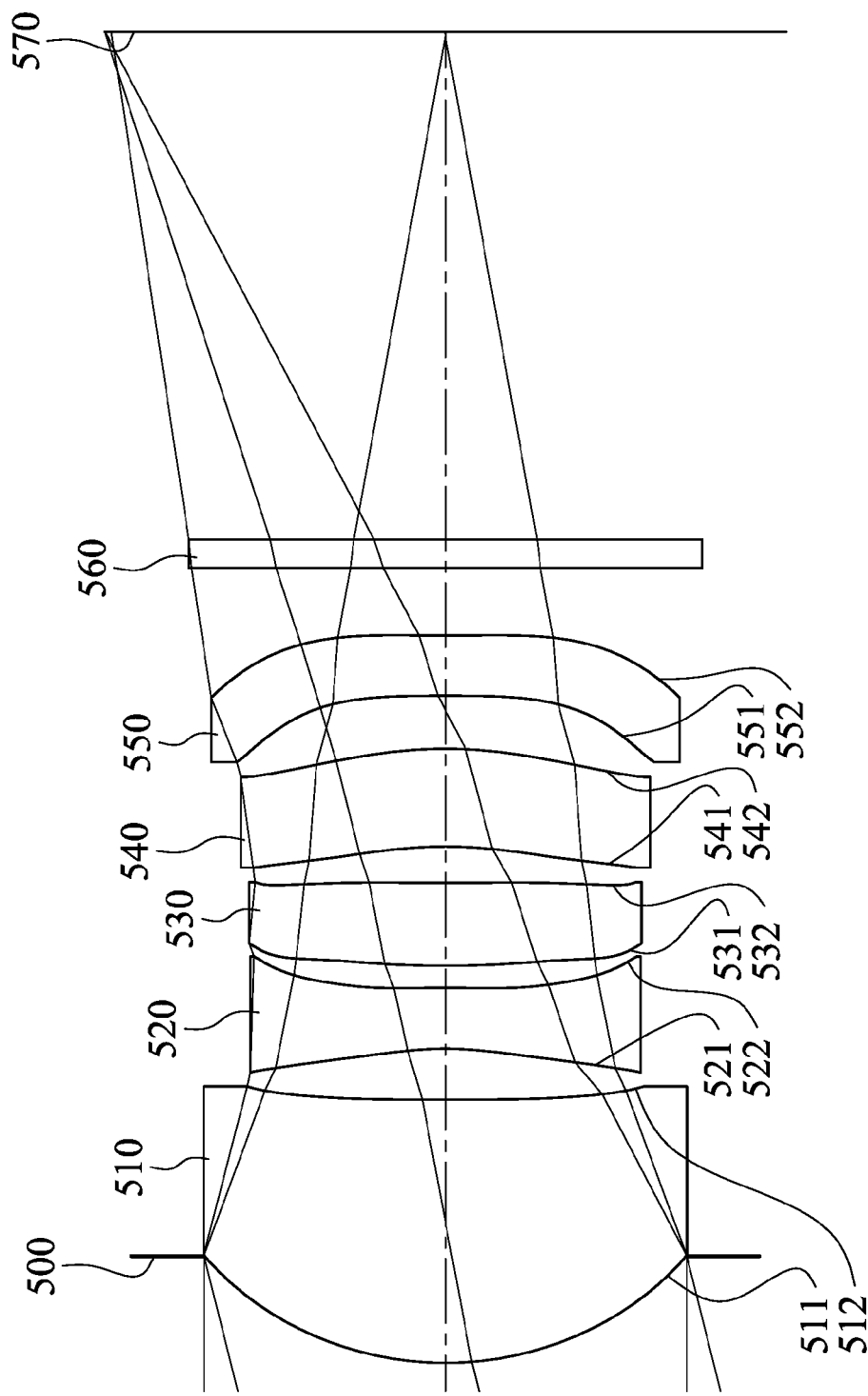
FIG. 9 is a schematic view of an optical photographing assembly according to the 5th embodiment of the present disclosure.

FIG. 9 is a schematic view of an optical photographing assembly according to the 5th embodiment of the present disclosure. FIG. 10 shows spherical aberration curves, astigmatic field curves and a distortion curve of the optical photographing assembly according to the 5th embodiment. In FIG. 9, the optical photographing assembly includes, in order from an object side to an image side, an aperture stop 500, a first lens element 510, a second lens element 520, a third lens element 530, a fourth lens element 540, a fifth lens element 550, a filter 560 and an image surface 570. The optical photographing assembly has a total of five lens elements (510-550), and there is an air space between every two lens elements of the first lens element 510, the second lens element 520, the third lens element 530, the fourth lens element 540 and the fifth lens element 550 that are adjacent to each other.

The first lens element 510 with positive refractive power has an object-side surface 511 being convex and an image-side surface 512 being concave. The first lens element 510 is made of a plastic material, and has the object-side surface 511 and the image-side surface 512 being both aspheric.

The second lens element 520 with negative refractive power has an object-side surface 521 being concave and an image-side surface 522 being convex. The second lens element 520 is made of a plastic material, and has the object-side surface 521 and the image-side surface 522 being both aspheric.

The third lens element 530 with positive refractive power has an object-side surface 531 being convex and an image-side surface 532 being concave. The third lens element 530 is made of a plastic material, and has the object-side surface 531 and the image-side surface 532 being both aspheric.

The fourth lens element 540 with positive refractive power has an object-side surface 541 being concave and an image-side surface 542 being convex in a paraxial region thereof. The fourth lens element 540 is made of a plastic material, and has the object-side surface 541 and the image-side surface 542 being both aspheric.

The fifth lens element 550 with negative refractive power has an object-side surface 551 being concave and an image-side surface 552 being concave. The fifth lens element 550 is made of a plastic material, and has the object-side surface 551 and the image-side surface 552 being both aspheric. Furthermore, the image-side surface 552 of the fifth lens element 550 includes at least one inflection point.

The filter 560 is made of a glass material and located between the fifth lens element 550 and the image surface 570, and will not affect the focal length of the optical photographing assembly.

The detailed optical data of the 5th embodiment are shown in Table 9 and the aspheric surface data are shown in Table 10 below.

TABLE 9

5th Embodiment
f = 10.00 mm, Fno = 2.80, HFOV = 14.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.790 | | | | |
| 2 | Lens 1 | 2.449 | ASP | 1.948 | Plastic | 1.544 | 55.9 | 4.56 |
| 3 | | 157.474 | ASP | 0.377 | | | | |
| 4 | Lens 2 | −2.277 | ASP | 0.451 | Plastic | 1.660 | 20.4 | −5.27 |
| 5 | | −7.114 | ASP | 0.162 | | | | |
| 6 | Lens 3 | 8.809 | ASP | 0.614 | Plastic | 1.660 | 20.4 | 19.57 |
| 7 | | 26.931 | ASP | 0.268 | | | | |
| 8 | Lens 4 | −3.197 | ASP | 0.724 | Plastic | 1.660 | 20.4 | 45.74 |
| 9 | | −3.151 | ASP | 0.392 | | | | |
| 10 | Lens 5 | −25.723 | ASP | 0.445 | Plastic | 1.544 | 55.9 | −17.76 |
| 11 | | 15.559 | ASP | 0.500 | | | | |
| 12 | Filter | Plano | | 0.210 | Glass | 1.517 | 64.2 | — |
| 13 | | Plano | | 3.756 | | | | |
| 14 | Image | Plano | | — | | | | |

Reference wavelength is 587.6 nm (d-line).

TABLE 10

| Aspheric Coefficients | | | | | |
|---|---|---|---|---|---|
| Surface # | 2 | 3 | 4 | 5 | 6 |
| k = | 3.4825E−01 | −9.9000E+01 | −1.6707E+01 | −5.6125E+01 | 3.1153E+01 |
| A4 = | −3.1540E−03 | 3.2221E−02 | 1.1728E−01 | 3.3728E−01 | 7.8446E−02 |
| A6 = | 2.8498E−04 | −8.6956E−03 | −1.2785E−01 | −4.3295E−01 | −2.2635E−01 |
| A8 = | −5.3145E−04 | −6.3796E−03 | 6.2301E−02 | 3.4406E−01 | 2.3119E−01 |
| A10 = | 1.4765E−04 | 5.5828E−03 | −1.2241E−02 | −1.8195E−01 | −1.4772E−01 |
| A12 = | −2.3018E−05 | −9.2421E−04 | 3.0213E−04 | 6.4051E−02 | 5.8334E−02 |
| A14 = | | | | −1.0436E−02 | −9.5736E−03 |
| Surface # | 7 | 8 | 9 | 10 | 11 |
| k = | 1.8397E+01 | −6.2153E+00 | −4.1401E+00 | 8.9439E+01 | 7.5519E+01 |
| A4 = | −3.1844E−02 | 4.8784E−02 | 2.4205E−02 | −1.1385E−01 | −1.0901E−01 |
| A6 = | −3.3216E−02 | −6.5104E−02 | −2.5368E−02 | 7.6606E−03 | 3.2419E−02 |
| A8 = | 7.9509E−02 | 1.2279E−01 | 4.9285E−02 | 3.2033E−02 | −6.1525E−03 |
| A10 = | −5.3637E−02 | −1.0368E−01 | −4.1534E−02 | −3.2357E−02 | −2.7516E−03 |
| A12 = | 1.2629E−02 | 3.8244E−02 | 1.5078E−02 | 1.1318E−02 | 1.5909E−03 |
| A14 = | | −5.2081E−03 | −1.9137E−03 | −1.1833E−03 | −2.2988E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 10.00 | ΣCT/ΣAT | 3.49 |
| Fno | 2.80 | f/ImgH | 3.97 |
| HFOV [deg.] | 14.0 | f/TD | 1.86 |
| V2 | 20.4 | SD/TD | 0.85 |
| V3 | 20.4 | BL/TD | 0.83 |
| V4 | 20.4 | TD/TP1 | — |
| tan(FOV) | 0.53 | TD/TP2 | — |
| T23/CT1 | 0.08 | Yo/Yi | 1.03 |
| (R3 − R4)/(R3 + R4) | −0.52 | Ymax/Ymin | 1.27 |
| (R5 + R6)/(R5 − R6) | −1.97 | VRO | — |
| f/R7 | −3.13 | VRI | — |
| |f1/f2| | 0.86 | T12i/T12m | — |
| f/f4 | 0.22 | |Dr1s/Dr2s| | 0.68 |
| f/f5 | −0.56 | (WPO + WPI)/f | — |
| |f/f1| + |f/f2| | 4.09 | DP/(WPO + WPI) | — |
| CT1/(ΣCT − CT1) | 0.87 | | |

6th Embodiment

Figure 11A:
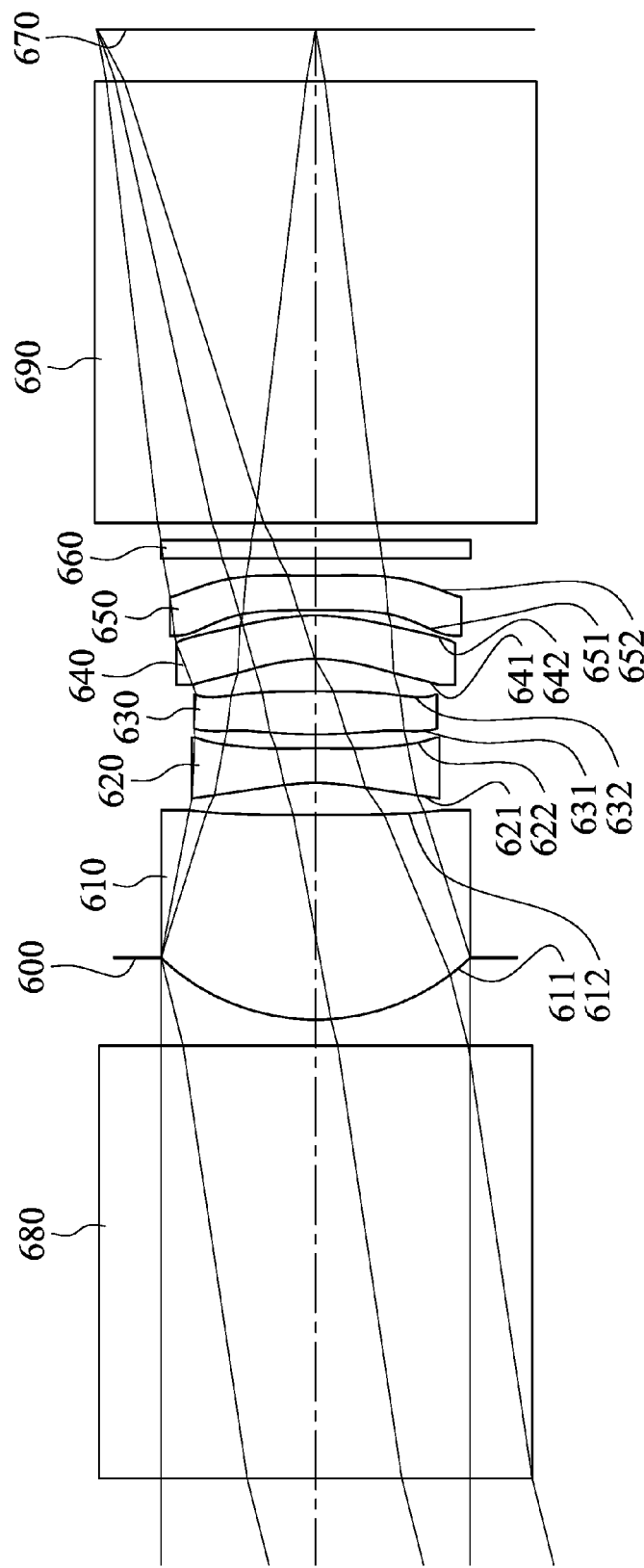
FIG. 11A is a schematic view of an optical photographing assembly according to the 6th embodiment of the present disclosure.
Figure 12:
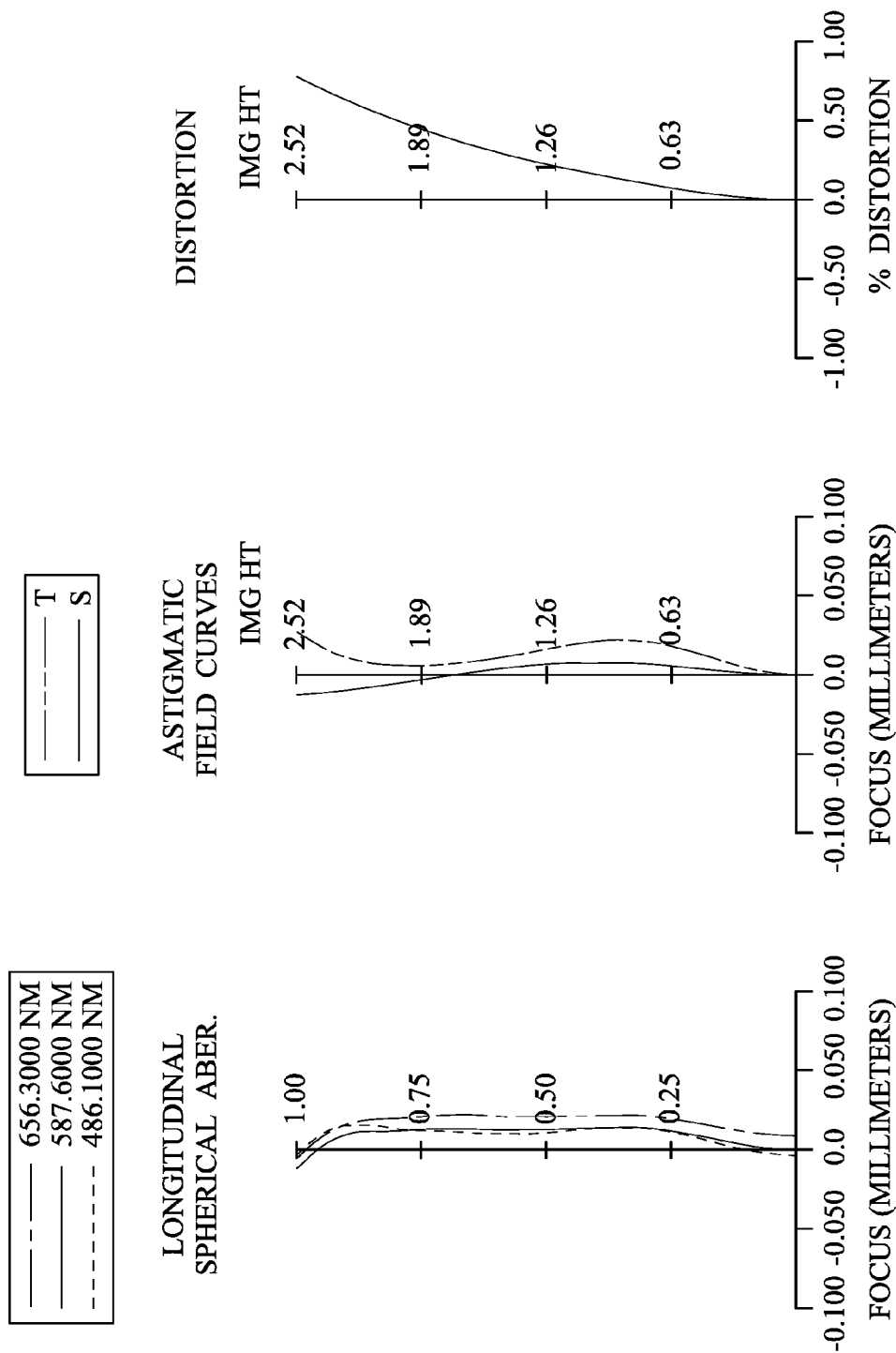
FIG. 12 shows spherical aberration curves, astigmatic field curves and a distortion curve of the optical photographing assembly according to the 6th embodiment.

FIG. 11A is a schematic view of an optical photographing assembly according to the 6th embodiment of the present disclosure. FIG. 12 shows spherical aberration curves, astigmatic field curves and a distortion curve of the optical photographing assembly according to the 6th embodiment. In FIG. 11A, the optical photographing assembly includes, in order from an object side to an image side, a prism 680, an aperture stop 600, a first lens element 610, a second lens element 620, a third lens element 630, a fourth lens element 640, a fifth lens element 650, a filter 660, a prism 690 and an image surface 670. The optical photographing assembly has a total of five lens elements (610-650), and there is an air space between every two lens elements of the first lens element 610, the second lens element 620, the third lens element 630, the fourth lens element 640 and the fifth lens element 650 that are adjacent to each other.

The first lens element 610 with positive refractive power has an object-side surface 611 being convex and an image-side surface 612 being convex. The first lens element 610 is made of a plastic material, and has the object-side surface 611 and the image-side surface 612 being both aspheric.

The second lens element 620 with negative refractive power has an object-side surface 621 being concave and an image-side surface 622 being convex. The second lens element 620 is made of a plastic material, and has the object-side surface 621 and the image-side surface 622 being both aspheric.

The third lens element 630 with positive refractive power has an object-side surface 631 being convex and an image-side surface 632 being convex. The third lens element 630 is made of a plastic material, and has the object-side surface 631 and the image-side surface 632 being both aspheric.

The fourth lens element 640 with positive refractive power has an object-side surface 641 being concave and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being convex and an image-side surface 652 being concave. The fifth lens element 650 is made of a plastic material, and has the object-side surface 651 and the image-side surface 652 being both aspheric. Furthermore, both of the object-side surface 651 and the image-side surface 652 of the fifth lens element 650 include at least one inflection point.

The filter 660 is made of a glass material and located between the fifth lens element 650 and the image surface 670, and will not affect the focal length of the optical photographing assembly.

In the optical photographing assembly according to the 6th embodiment, the optical photographing assembly includes two prisms 680, 690 which are made of glass materials. The prism 680 can be an object-side reflective element located between an imaged object (its reference numeral is omitted) and the aperture stop 600 on an optical path (which is located on an optical axis of the optical photographing assembly according to the 6th embodiment). The prism 690 can be an image-side reflective element located between the filter 660 and the image surface 670 on the optical path (which is located on the optical axis of the optical photographing assembly according to the 6th embodiment).

The detailed optical data of the 6th embodiment are shown in Table 11 and the aspheric surface data are shown in Table 12 below.

TABLE 11

6th Embodiment
f = 9.99 mm, Fno = 2.80, HFOV = 14.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 5.000 | Plastic | 1.660 | 20.4 | — |
| 2 | | Plano | | 1.015 | | | | |
| 3 | Ape. Stop | Plano | | −0.715 | | | | |
| 4 | Lens 1 | 2.609 | ASP | 2.365 | Plastic | 1.544 | 55.9 | 4.76 |
| 5 | | −207.479 | ASP | 0.369 | | | | |
| 6 | Lens 2 | −2.261 | ASP | 0.400 | Plastic | 1.660 | 20.4 | −5.5 |
| 7 | | −6.409 | ASP | 0.162 | | | | |
| 8 | Lens 3 | 9.673 | ASP | 0.498 | Plastic | 1.660 | 20.4 | 9.61 |
| 9 | | −18.035 | ASP | 0.373 | | | | |
| 10 | Lens 4 | −1.998 | ASP | 0.500 | Plastic | 1.660 | 20.4 | −15.19 |
| 11 | | −2.744 | ASP | 0.062 | | | | |
| 12 | Lens 5 | 53.262 | ASP | 0.400 | Plastic | 1.544 | 55.9 | −37.37 |
| 13 | | 14.668 | ASP | 0.200 | | | | |
| 14 | Filter | Plano | | 0.210 | Glass | 1.517 | 64.2 | — |
| 15 | | Plano | | 0.200 | | | | |
| 16 | Prism | Plano | | 5.100 | Plastic | 1.544 | 55.9 | — |
| 17 | | Plano | | 0.596 | | | | |
| 18 | Image | Plano | | — | | | | |

Reference wavelength is 587.6 nm (d-line).
Both of Prisms (680, 690) have reflective surface.

TABLE 12

Aspheric Coefficients

| Surface # | 4 | 5 | 6 | 7 | 8 |
|---|---|---|---|---|---|
| k = | 3.4417E−01 | −9.9000E+01 | −1.4120E+01 | −5.6125E+01 | 2.8852E+01 |
| A4 = | −2.3366E−03 | 2.3148E−02 | 1.0681E−01 | 3.2173E−01 | 1.2921E−01 |
| A6 = | −6.3911E−05 | −4.5544E−03 | −1.2681E−01 | −4.7007E−01 | −3.4199E−01 |
| A8 = | −2.4564E−04 | −7.7864E−03 | 7.2326E−02 | 4.2120E−01 | 3.6096E−01 |
| A10 = | 6.2732E−05 | 6.7844E−03 | −1.7649E−02 | −2.5563E−01 | −2.5234E−01 |
| A12 = | −1.2454E−05 | −1.4899E−03 | 1.0804E−03 | 9.7661E−02 | 1.0623E−01 |
| A14 = | | | | −1.6417E−02 | −1.8299E−02 |

| Surface # | 9 | 10 | 11 | 12 | 13 |
|---|---|---|---|---|---|
| k = | 3.8268E+01 | −3.3411E+00 | −2.4406E+00 | 8.9439E+01 | 7.2024E+01 |
| A4 = | 3.6688E−03 | 6.1062E−02 | 3.1336E−02 | −1.4747E−01 | −1.1185E−01 |
| A6 = | −1.0435E−01 | −1.3799E−01 | −1.3345E−02 | 1.1362E−01 | 6.6739E−02 |
| A8 = | 1.0862E−01 | 2.0638E−01 | 2.3520E−02 | −1.0036E−01 | −4.9355E−02 |
| A10 = | −2.7259E−02 | −1.3279E−01 | −2.1049E−02 | 4.8920E−02 | 2.3994E−02 |
| A12 = | −9.4132E−03 | 3.8403E−02 | 8.3481E−03 | −9.9620E−03 | −6.1131E−03 |
| A14 = | 4.7471E−03 | −4.2489E−03 | −1.2780E−03 | 6.6191E−04 | 6.3677E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 9.99 | ΣCT/ΣAT | 4.31 |
| Fno | 2.80 | f/ImgH | 3.97 |

-continued

| 6th Embodiment | | | |
|---|---|---|---|
| HFOV [deg.] | 14.1 | f/TD | 1.95 |
| V2 | 20.4 | SD/TD | 0.86 |
| V3 | 20.4 | BL/TD | 1.23 |
| V4 | 20.4 | TD/TP1 | 1.03 |
| tan(FOV) | 0.54 | TD/TP2 | 1.01 |
| T23/CT1 | 0.07 | Yo/Yi | 1.06 |
| (R3 − R4)/(R3 + R4) | −0.48 | Ymax/Ymin | 1.29 |
| (R5 + R6)/(R5 − R6) | −0.30 | VRO | 20.4 |
| f/R7 | −5.00 | VRI | 55.9 |
| |f1/f2| | 0.86 | T12i/T12m | — |

-continued

6th Embodiment

| | | | |
|---|---|---|---|
| f/f4 | −0.66 | \|Dr1s/Dr2s\| | 0.43 |
| f/f5 | −0.27 | (WPO + WPI)/f | 1.01 |
| \|f/f1\| + \|f/f2\| | 3.92 | DP/(WPO + WPI) | 0.60 |
| CT1/(ΣCT − CT1) | 1.32 | | |

Figure 11B:
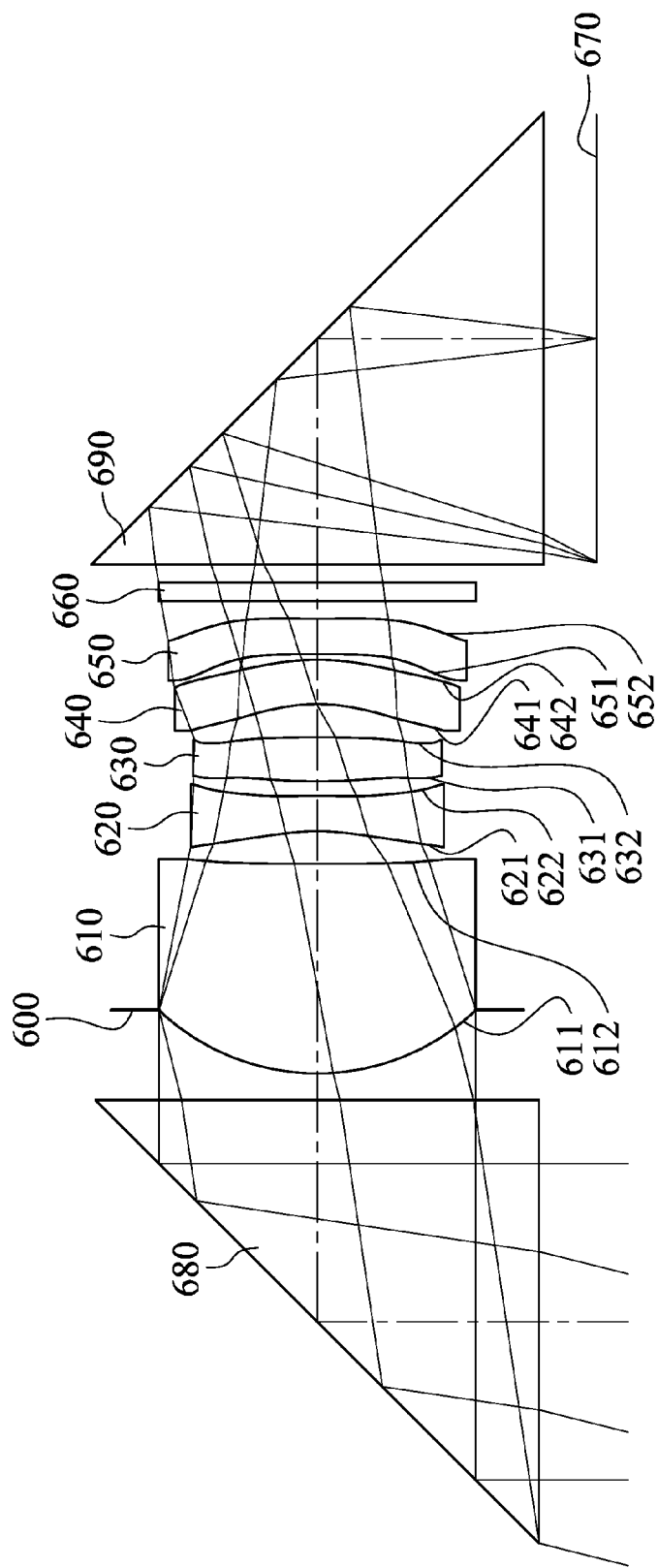
FIG. 11B is a schematic view of the optical photographing assembly according to the 6th embodiment of FIG. 11A which includes different shapes and arrangements of the prisms.
Figure 11C:
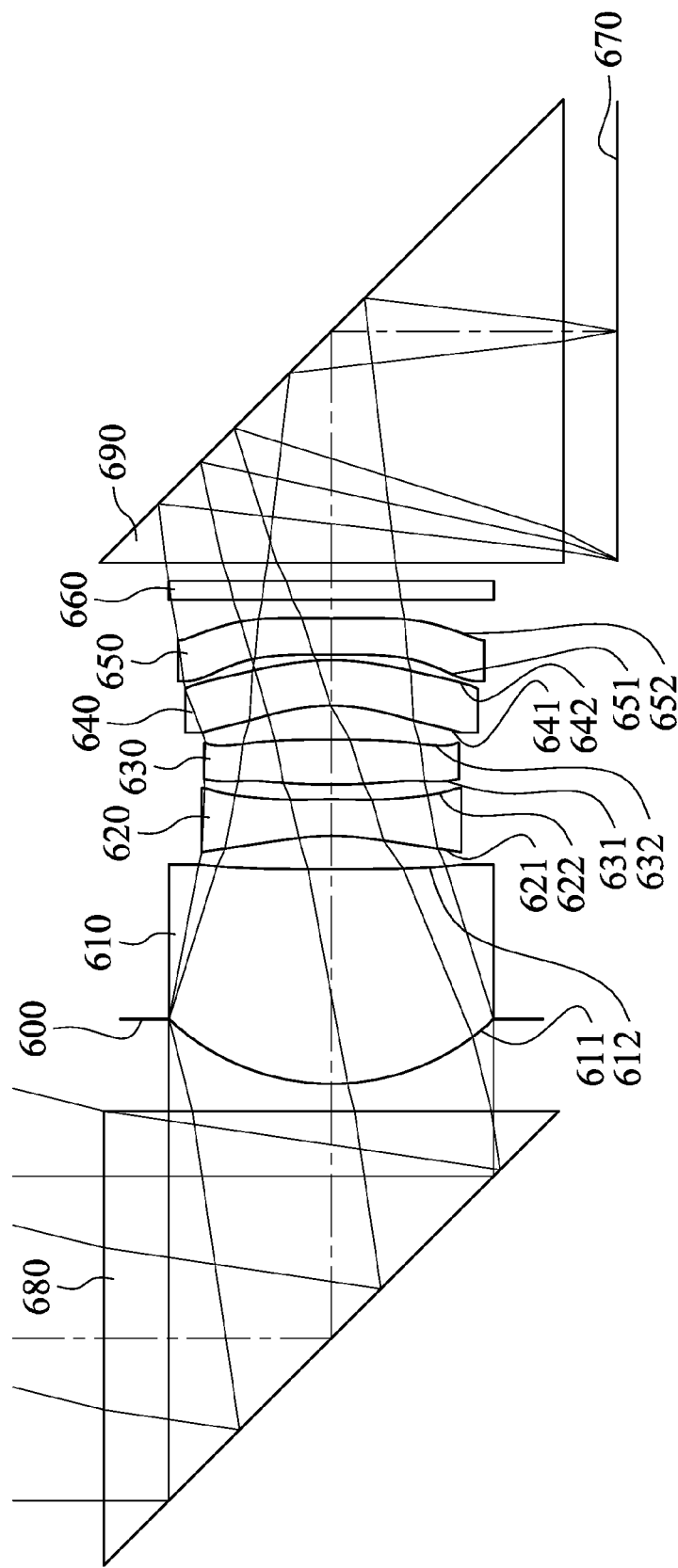
FIG. 11C is a schematic view of the optical photographing assembly according to the 6th embodiment of FIG. 11A which includes different shapes and arrangements of the prisms.

Furthermore, FIG. 11B and FIG. 11C are schematic views of the optical photographing assembly according to the 6th embodiment of FIG. 11A which include different shapes and arrangements of the prisms 680, 690, respectively. In FIG. 11B and FIG. 11C, the optical data of the prisms 680, 690 are the same as the optical data in Table 11, wherein the differences between FIG. 11A and FIG. 11B or FIG. 11A and FIG. 11C are the shapes and arrangements of the prisms 680, 690 so as to change the directions of the incident light of the optical photographing assembly and the outgoing light which is for imaging on the image surface 670. Therefore, it is favorable for applying to various image capturing apparatuses or electronic devices. Moreover, In FIG. 11B, an incident light through the object-side reflective element (prism 680) into the optical photographing assembly and the outgoing light through the image-side reflective element (prism 690) are on the same side of the optical axis of the lens elements.

7th Embodiment

Figure 13A:
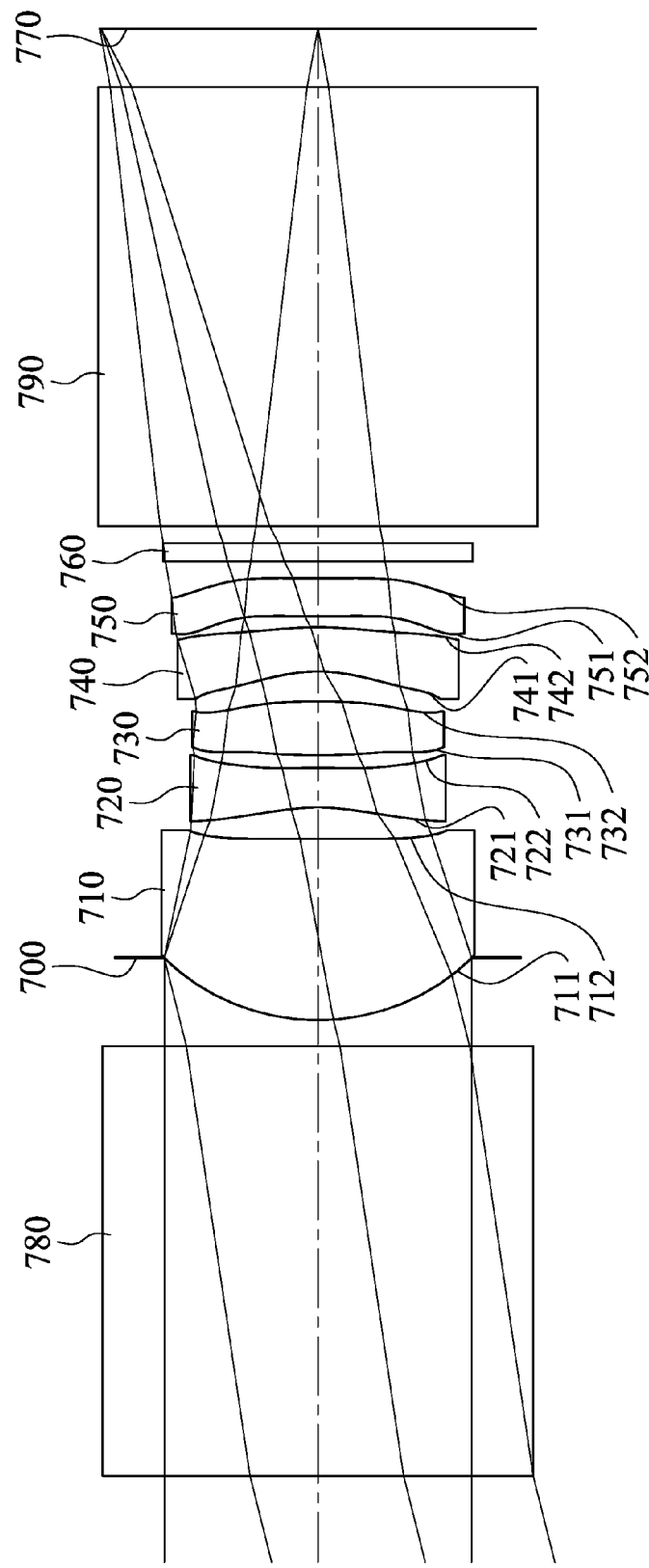
FIG. 13A is a schematic view of an optical photographing assembly according to the 7th embodiment of the present disclosure.
Figure 14A:
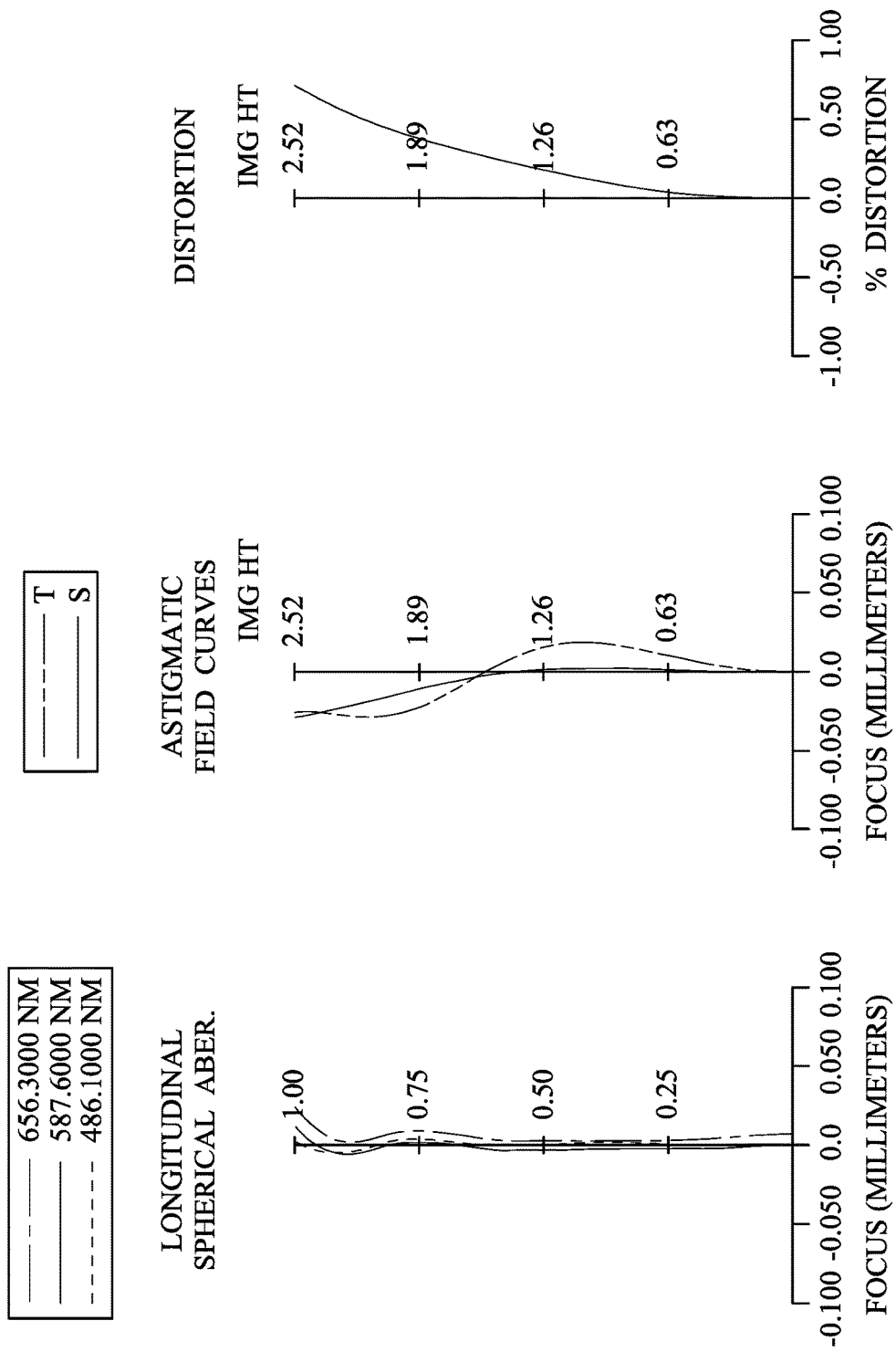
FIG. 14A shows spherical aberration curves, astigmatic field curves and a distortion curve of the optical photographing assembly when an object distance thereof is infinite according to the 7th embodiment.
Figure 14B:
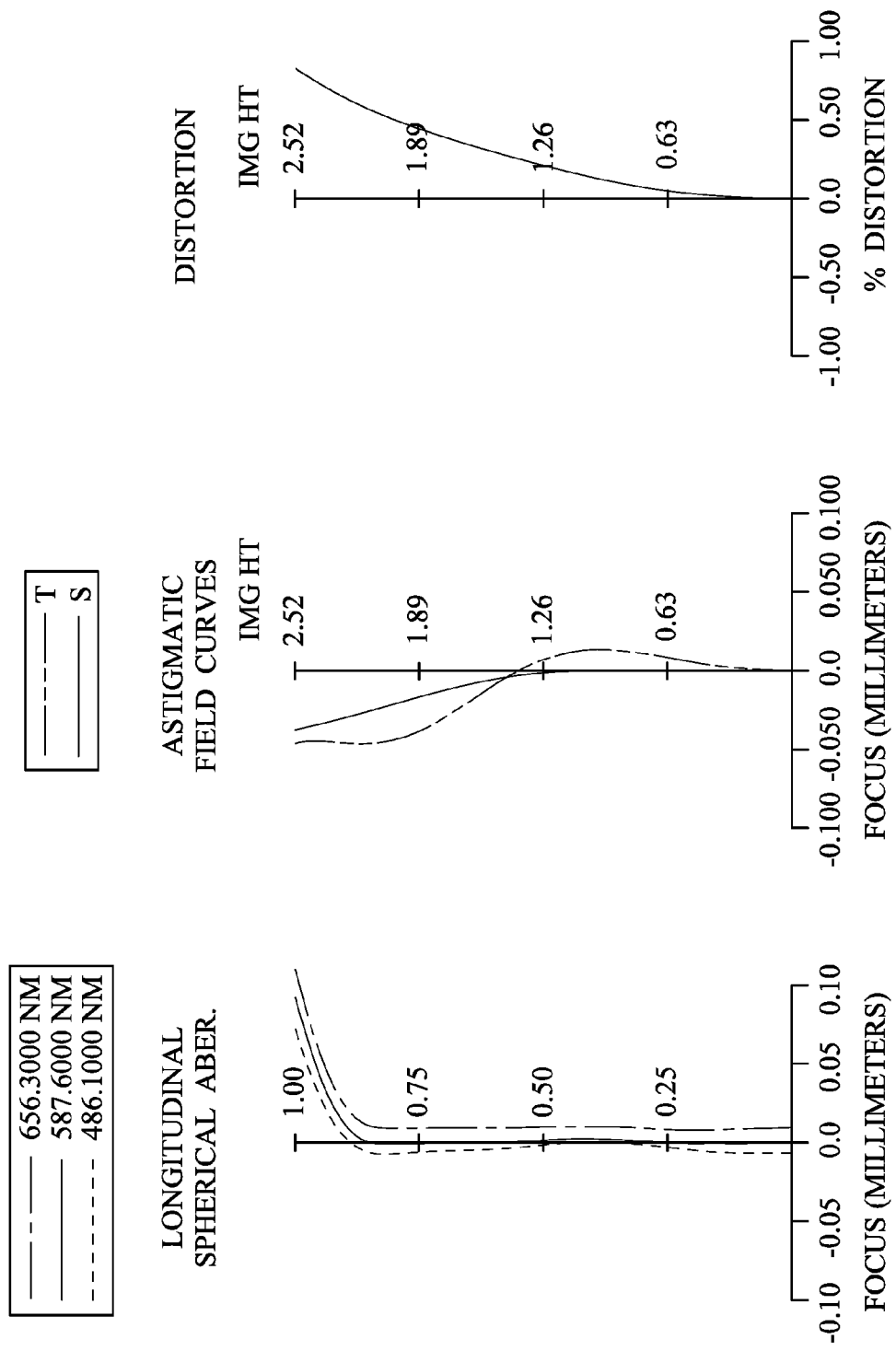
FIG. 14B shows spherical aberration curves, astigmatic field curves and a distortion curve of the optical photographing assembly when the object distance thereof is 400 mm according to the 7th embodiment.

FIG. 13A is a schematic view of an optical photographing assembly according to the 7th embodiment of the present disclosure. FIG. 14A shows spherical aberration curves, astigmatic field curves and a distortion curve of the optical photographing assembly when an object distance thereof is infinite according to the 7th embodiment. FIG. 14B shows spherical aberration curves, astigmatic field curves and a distortion curve of the optical photographing assembly when the object distance thereof is 400 mm according to the 7th embodiment. In FIG. 13A, the optical photographing assembly includes, in order from an object side to an image side, a prism 780, an aperture stop 700, a first lens element 710, a second lens element 720, a third lens element 730, a fourth lens element 740, a fifth lens element 750, a filter 760, a prism 790 and an image surface 770. The optical photographing assembly has a total of five lens elements (710-750), and there is an air space between every two lens elements of the first lens element 710, the second lens element 720, the third lens element 730, the fourth lens element 740 and the fifth lens element 750 that are adjacent to each other.

The first lens element 710 with positive refractive power has an object-side surface 711 being convex and an image-side surface 712 being convex. The first lens element 710 is made of a plastic material, and has the object-side surface 711 and the image-side surface 712 being both aspheric. In the 7th embodiment, the first lens element 710 is a movable focusing lens element, and there is a relative displacement between the first lens element 710 and the second lens element 720. In FIG. 13A, the symbol of double arrow under the first lens element 710 means that the first lens element 710 can be moved relative to the second lens element 720 along the optical axis.

The second lens element 720 with negative refractive power has an object-side surface 721 being concave and an image-side surface 722 being convex. The second lens element 720 is made of a plastic material, and has the object-side surface 721 and the image-side surface 722 being both aspheric.

The third lens element 730 with positive refractive power has an object-side surface 731 being convex and an image-side surface 732 being convex. The third lens element 730 is made of a plastic material, and has the object-side surface 731 and the image-side surface 732 being both aspheric.

The fourth lens element 740 with negative refractive power has an object-side surface 741 being concave and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being convex and an image-side surface 752 being concave. The fifth lens element 750 is made of a plastic material, and has the object-side surface 751 and the image-side surface 752 being both aspheric. Furthermore, both of the object-side surface 751 and the image-side surface 752 of the fifth lens element 750 include at least one inflection point.

The filter 760 is made of a glass material and located between the fifth lens element 750 and the image surface 770, and will not affect the focal length of the optical photographing assembly.

In the optical photographing assembly according to the 7th embodiment, the optical photographing assembly includes two prisms 780, 790 which are made of glass materials. The prism 780 can be an object-side reflective element located between an imaged object (its reference numeral is omitted) and the aperture stop 700 on an optical path (which is located on an optical axis of the optical photographing assembly according to the 7th embodiment). The prism 790 can be an image-side reflective element located between the filter 760 and the image surface 770 on the optical path (which is located on the optical axis of the optical photographing assembly according to the 7th embodiment).

The detailed optical data of the 7th embodiment are shown in Table 13 and the aspheric surface data are shown in Table 14 below.

TABLE 13

7th Embodiment
f = 9.99 mm/9.79 mm, Fno = 2.80, HFOV = 14.1 deg./13.9 deg.

| | | | Thickness | | | | | |
|---|---|---|---|---|---|---|---|---|
| Surface # | | Curvature Radius | Position 1 | Position 2 | Material | Index | Abbe # | Focal Length |
| 0 | Object | Plano | Infinity | 400.000 | | | | |
| 1 | Prism | Plano | 5.000 | | Plastic | 1.660 | 20.4 | — |
| 2 | | Plano | 1.024 | | | | | |

TABLE 13-continued

7th Embodiment
f = 9.99 mm/9.79 mm, Fno = 2.80, HFOV = 14.1 deg./13.9 deg.

| Surface # | | Curvature Radius | | Thickness Position 1 | Position 2 | Material | Index | Abbe # | Focal Length |
|---|---|---|---|---|---|---|---|---|---|
| 3 | Ape. Stop | Plano | | | −0.724 | | | | |
| 4 | Lens 1 | 2.608 | ASP | | 2.106 | Plastic | 1.544 | 55.9 | 4.62 |
| 5 | | −49.903 | ASP | 0.367 | 0.420 | | | | |
| 6 | Lens 2 | −2.193 | ASP | | 0.461 | Plastic | 1.660 | 20.4 | −5.24 |
| 7 | | −6.505 | ASP | | 0.144 | | | | |
| 8 | Lens 3 | 8.550 | ASP | | 0.626 | Plastic | 1.660 | 20.4 | 6.71 |
| 9 | | −8.918 | ASP | | 0.348 | | | | |
| 10 | Lens 4 | −1.946 | ASP | | 0.514 | Plastic | 1.615 | 26.0 | −6.46 |
| 11 | | −4.198 | ASP | | 0.126 | | | | |
| 12 | Lens 5 | 11.083 | ASP | | 0.441 | Plastic | 1.544 | 55.9 | 66.19 |
| 13 | | 15.791 | ASP | | 0.200 | | | | |
| 14 | Filter | Plano | | | 0.210 | Glass | 1.517 | 64.2 | — |
| 15 | | Plano | | | 0.200 | | | | |
| 16 | Prism | Plano | | | 5.100 | Plastic | 1.544 | 55.9 | — |
| 17 | | Plano | | 0.682 | 0.685 | | | | |
| 18 | Image | Plano | | | — | | | | |

Reference wavelength is 587.6 nm (d-line).
Both of Prisms (780, 790) have reflective surface.
Both of f and HFOV include data under the object distance being infinite and 400 mm.

TABLE 14

Aspheric Coefficients

| Surface # | 4 | 5 | 6 | 7 | 8 |
|---|---|---|---|---|---|
| k = | 3.2170E−01 | 4.6331E+01 | −1.3677E+01 | −4.7935E+01 | 2.7944E+01 |
| A4 = | −2.2026E−03 | 1.9264E−02 | 7.6874E−02 | 2.8271E−01 | 7.5942E−02 |
| A6 = | 5.9217E−05 | −2.0933E−03 | −6.6196E−02 | −3.6008E−01 | −2.2878E−01 |
| A8 = | −1.7406E−04 | 1.1625E−03 | 3.2657E−02 | 2.9193E−01 | 2.0959E−01 |
| A10 = | 4.4954E−05 | −3.8814E−04 | −7.6745E−03 | −1.6195E−01 | −1.1951E−01 |
| A12 = | −5.9234E−06 | 3.2638E−04 | 6.9543E−04 | 5.5728E−02 | 4.3388E−02 |
| A14 = | | | | −8.2978E−03 | −6.7369E−03 |

| Surface # | 9 | 10 | 11 | 12 | 13 |
|---|---|---|---|---|---|
| k = | 3.0324E+01 | −4.0348E+00 | −1.6120E+01 | −6.8825E+00 | 7.2913E+01 |
| A4 = | −5.2530E−02 | 2.1838E−02 | 3.0780E−02 | −1.0981E−01 | −8.4919E−02 |
| A6 = | −1.0620E−03 | 4.2724E−03 | 4.6343E−02 | 7.4213E−02 | 3.4875E−02 |
| A8 = | 3.4280E−02 | 4.0614E−02 | −7.2748E−02 | −8.9219E−02 | −2.9555E−02 |
| A10 = | −5.0550E−03 | −4.4695E−02 | 4.0027E−02 | 5.2804E−02 | 1.6995E−02 |
| A12 = | −7.0112E−03 | 1.6927E−02 | −1.0491E−02 | −1.3026E−02 | −4.7038E−03 |
| A14 = | 2.4665E−03 | −2.6940E−03 | 1.0746E−03 | 1.1762E−03 | 5.2824E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again. Further, one condition with two data refers to, from left to right, under the object distance being infinite and 400 mm, respectively.

Moreover, these parameters can be calculated from Table 13 and Table 14 as the following values and satisfy the following conditions:

| 7th Embodiment | | | |
|---|---|---|---|
| f [mm] | 9.99/9.79 | ΣCT/ΣAT | 4.21/4.00 |
| Fno. | 2.80 | f/ImgH | 3.96/3.88 |
| HFOV [deg.] | 14.1/13.9 | f/TD | 1.95/1.89 |
| V2 | 20.4 | SD/TD | 0.86/0.86 |
| V3 | 20.4 | BL/TD | 1.25/1.23 |
| V4 | 26.0 | TD/TP1 | 1.03/1.04 |
| tan(FOV) | 0.54/0.53 | TD/TP2 | 1.01/1.02 |
| T23/CT1 | 0.07 | Yo/Yi | 1.05/1.07 |
| (R3 − R4)/(R3 + R4) | −0.50 | Ymax/Ymin | 1.26/1.28 |
| (R5 + R6)/(R5 − R6) | −0.02 | VRO | 20.4 |
| f/R7 | −5.13/−5.03 | VRI | 55.9 |
| \|f1/f2\| | 0.88 | T12i/T12m | 0.87 |
| f/f4 | −1.55/−1.52 | \|Dr1s/Dr2s\| | 0.52 |
| f/f5 | 0.15/0.15 | (WPO + WPI)/f | 1.01/1.03 |
| \|f/f1\| + \|f/f2\| | 4.07/3.99 | DP/(WPO + WPI) | 0.60/0.60 |
| CT1/(ΣCT − CT1) | 1.03 | | |

Figure 13B:
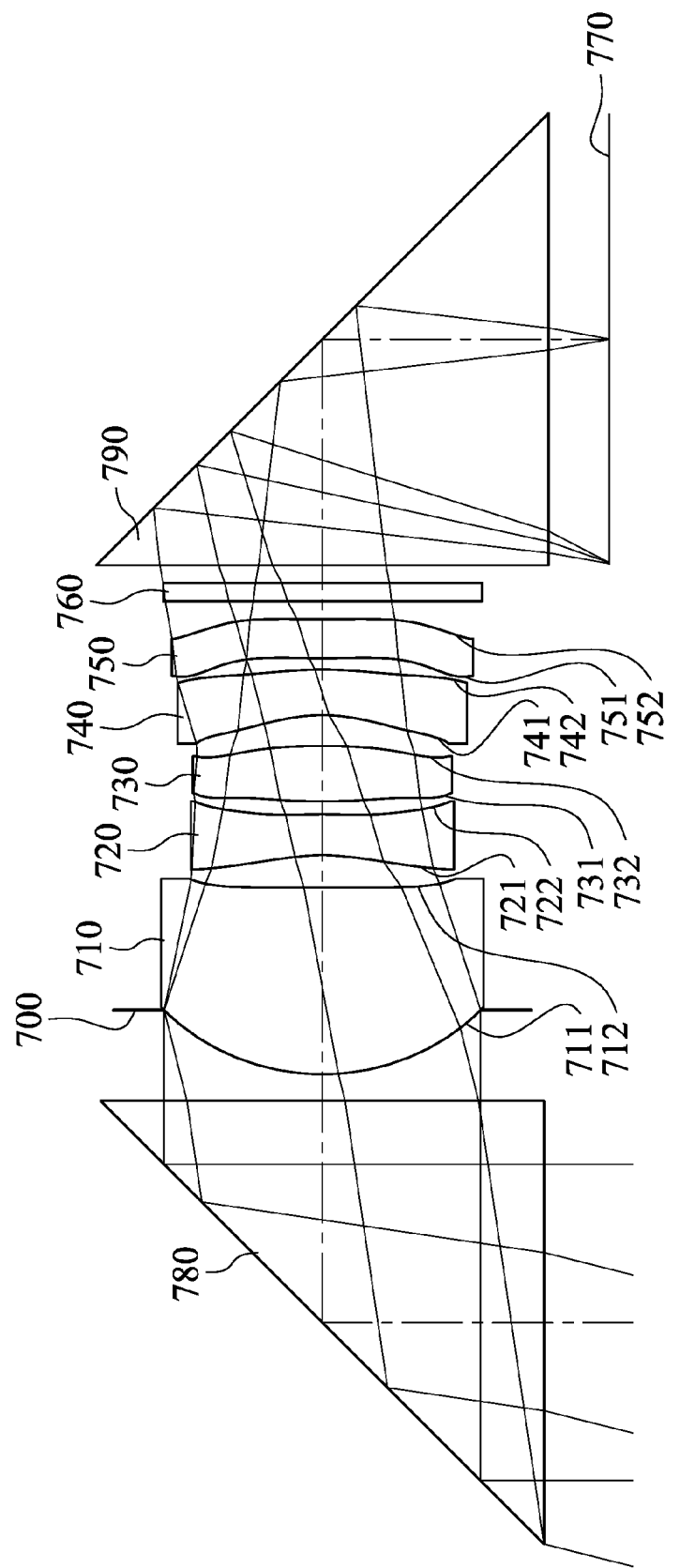
FIG. 13B is a schematic view of the optical photographing assembly according to the 7th embodiment of FIG. 13A which include different shapes and arrangements of the prisms.
Figure 13C:
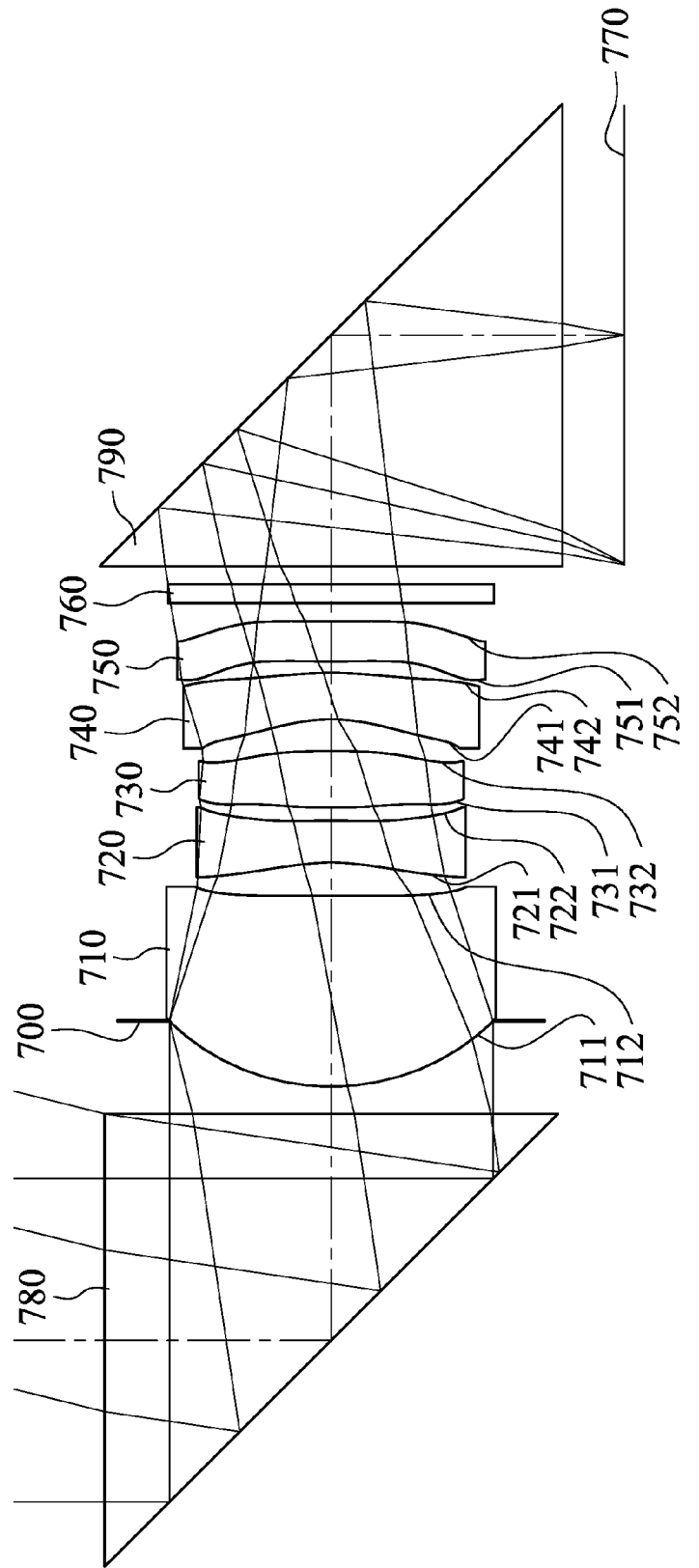
FIG. 13C is a schematic view of the optical photographing assembly according to the 7th embodiment of FIG. 13A which include different shapes and arrangements of the prisms.

Furthermore, FIG. 13B and FIG. 13C are schematic views of the optical photographing assembly according to the 7th embodiment of FIG. 13A which include different shapes and arrangements of the prisms 780, 790, respectively. In FIG.

13B and FIG. 13C, the optical data of the prisms 780, 790 are the same as the optical data in Table 13, wherein the differences between FIG. 13A and FIG. 13B or FIG. 13A and FIG. 13C are the shapes and arrangements of the prisms 780, 790 so as to change the directions of the incident light of the optical photographing assembly and the outgoing light which is for imaging on the image surface 770. Therefore, it is favorable for applying to various image capturing apparatuses or electronic devices. Moreover, In FIG. 13B, an incident light through the object-side reflective element (prism 780) into the optical photographing assembly and the outgoing light through the image-side reflective element (prism 790) are on the same side of the optical axis of the lens elements.

8th Embodiment

Figure 15:
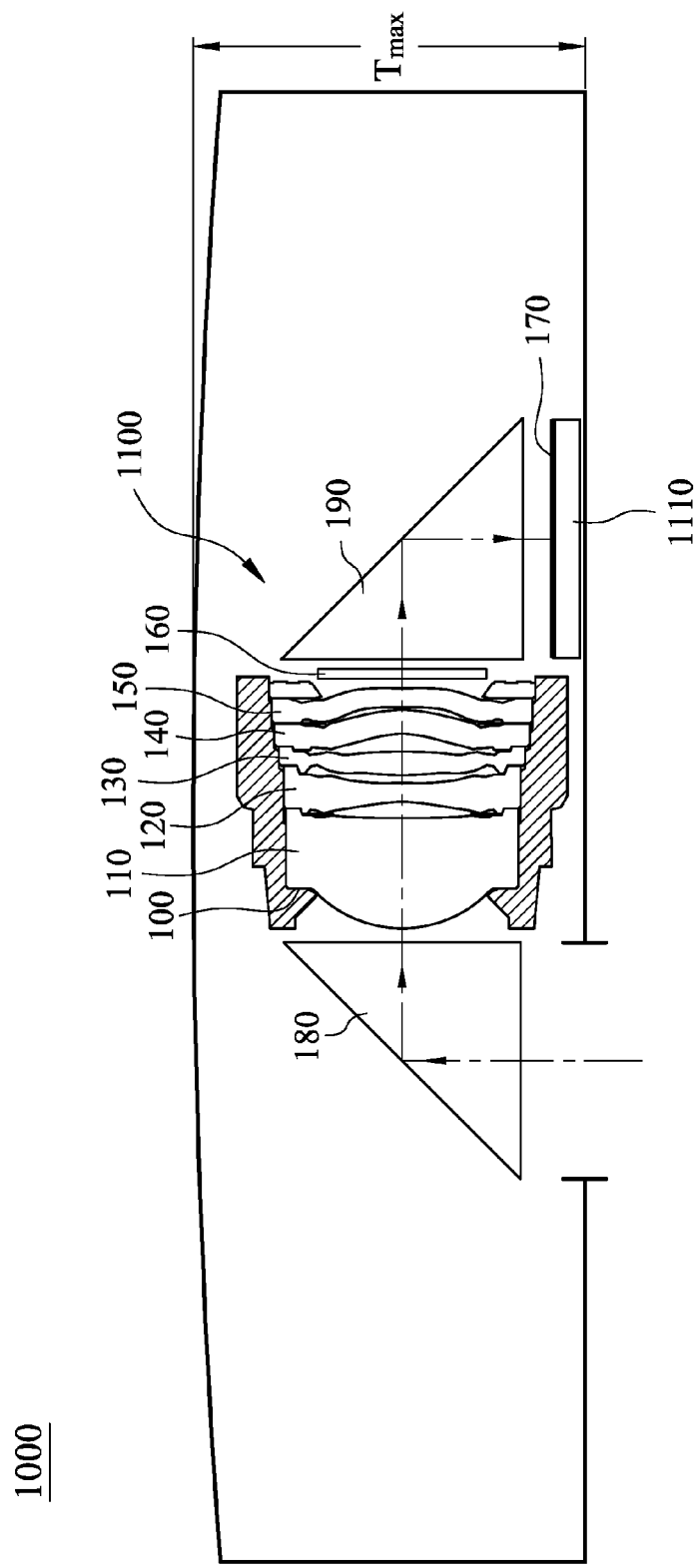
FIG. 15 is a schematic view of an electronic device according to the 8th embodiment of the present disclosure.

FIG. 15 is a schematic view of an electronic device 1000 according to the 8th embodiment of the present disclosure. According to the 8th embodiment, the electronic device 1000 includes an image capturing apparatus 1100. The image capturing apparatus 1100 includes an optical photographing assembly (its reference numeral is omitted) and an image sensor 1110, wherein the image sensor 1110 is disposed on the image surface 170 of the optical photographing assembly. The optical photographing assembly includes, in order from an object side to an image side along the optical axis, an object-side reflective element, a plurality of lens elements and an image-side reflective element, wherein the optical photographing assembly of the image capturing apparatus 1100 can be any one of the optical photographing assembly of the aforementioned 1st to 7th embodiments, and the optical photographing assembly according to the 8th embodiment is the same as the optical photographing assembly according to the 1st embodiment, and the detailed description referring to FIG. 15 is stated as follow.

In the optical photographing assembly according to the 8th embodiment, the object-side reflective element is the prism 180, and the image-side reflective element is the prism 190, wherein there is no lens element along the optical axis between the object-side reflective element (the prism 180) and the imaged object, there is no lens element along an optical axis between the image-side reflective element (the prism 190) and the image surface 1150. The plurality of lens elements of the optical photographing assembly includes, in order from an object side to an image side along the optical axis, the first lens element 110, the second lens element 120, the third lens element 130, the fourth lens element 140 and the fifth lens element 150, and further includes the aperture stop 100 located between the prism 180 and the first lens element 110, and the filter 160 located between the fifth lens element 150 and the prism 190. In the 8th embodiment, shape, optical characteristic and data of each element are the same as the description of the 1st embodiment, and will not describe again herein.

In FIG. 15, when a maximum total length of the electronic device 1000 is Tmax, the focal length of the optical photographing assembly is f, and according to the 8th embodiment, f=10.00 mm and Tmax=7.46 mm. Therefore, the maximum total length of the electronic device is shorter than the focal length of the optical photographing assembly (Tmax<f).

Furthermore, according to the 8th embodiment, the optical photographing assembly is movable in the image capturing apparatus 1100 for stabilizing an image, for example, the image capturing apparatus 1100 can further include optical image stabilization functionality.

9th Embodiment

Figure 16:
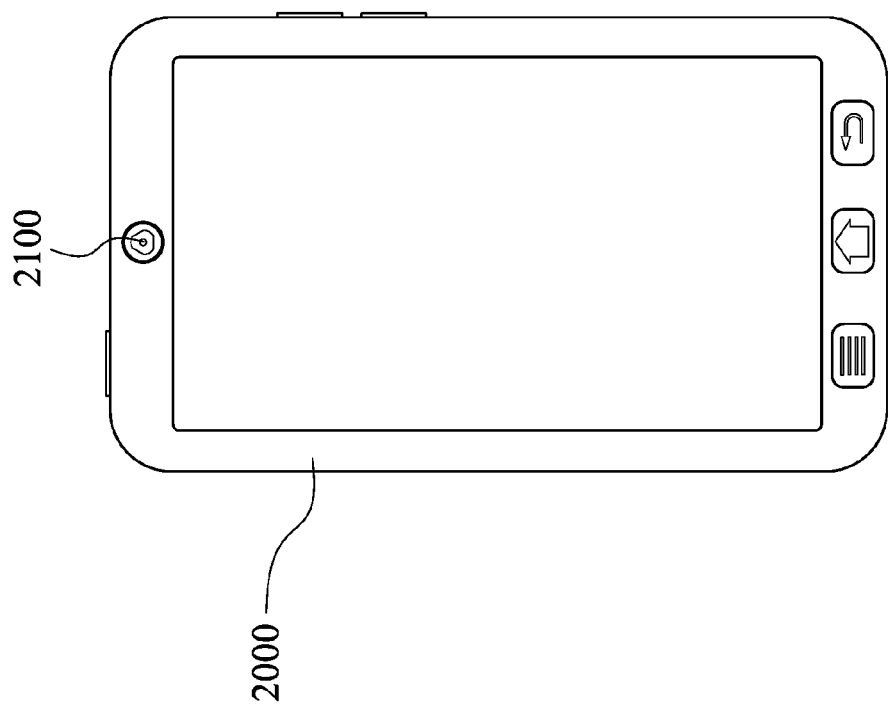
FIG. 16 is a schematic view of an electronic device according to the 9th embodiment of the present disclosure.

FIG. 16 is a schematic view of an electronic device 2000 according to the 9th embodiment of the present disclosure. The electronic device 2000 of the 9th embodiment is a smartphone, wherein the electronic device 2000 includes an image capturing apparatus 2100. The image capturing apparatus 2100 includes an optical photographing assembly (its reference numeral is omitted) according to the present disclosure and an image sensor (its reference numeral is omitted), wherein the image sensor is disposed on an image surface of the optical photographing assembly.

10th Embodiment

Figure 17:
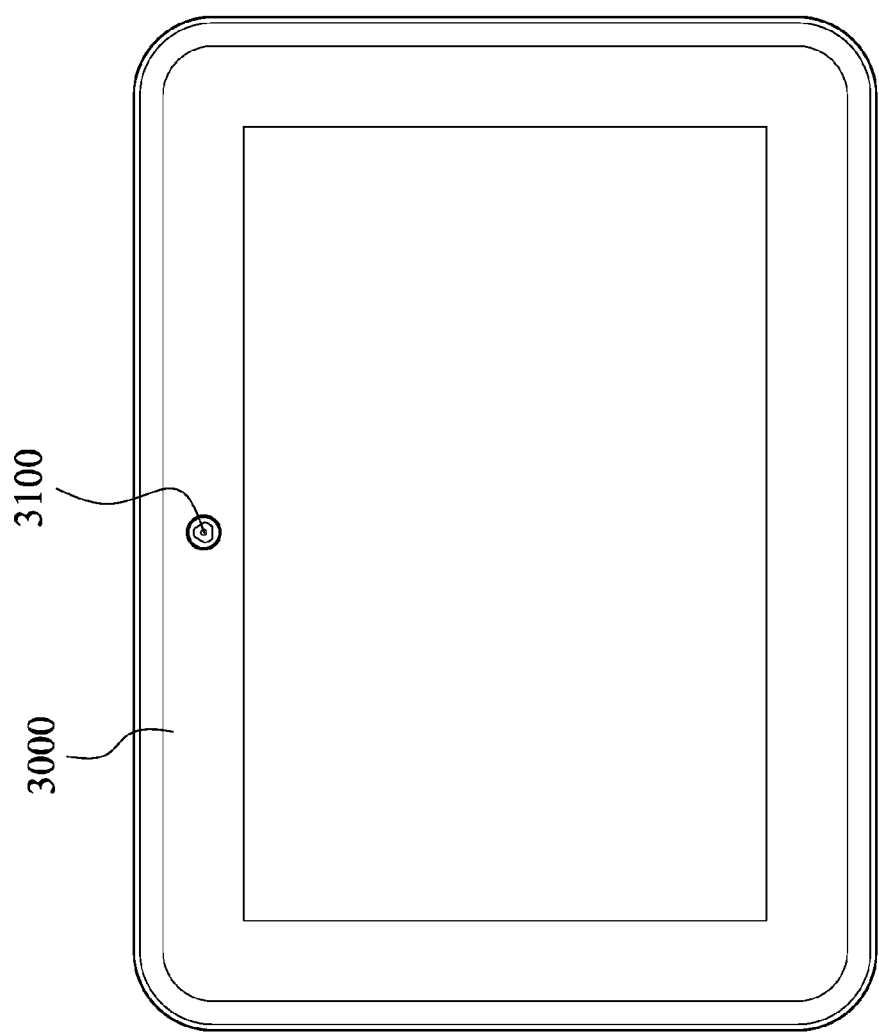
FIG. 17 is a schematic view of an electronic device according to the 10th embodiment of the present disclosure.

FIG. 17 is a schematic view of an electronic device 3000 according to the 10th embodiment of the present disclosure. The electronic device 3000 of the 10th embodiment is a tablet personal computer, wherein the electronic device 3000 includes an image capturing apparatus 3100. The image capturing apparatus 3100 includes an optical photographing assembly (its reference numeral is omitted) according to the present disclosure and an image sensor (its reference numeral is omitted), wherein the image sensor is disposed on an image surface of the optical photographing assembly.

11th Embodiment

Figure 18:
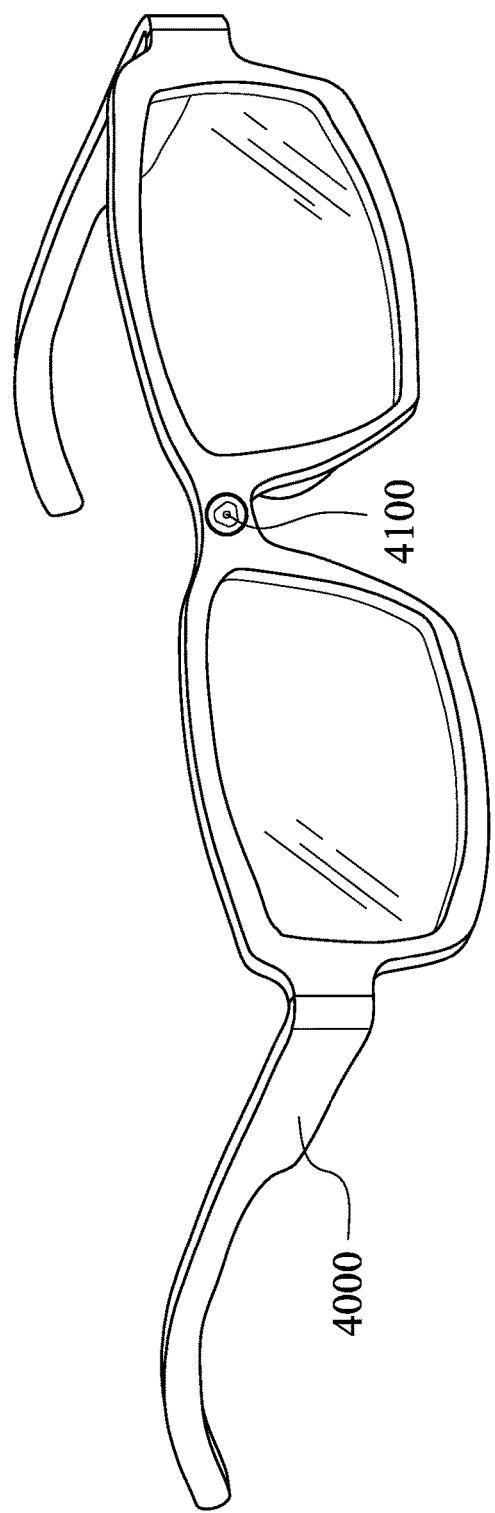
FIG. 18 is a schematic view of an electronic device according to the 11th embodiment of the present disclosure.

FIG. 18 is a schematic view of an electronic device 4000 according to the 11th embodiment of the present disclosure. The electronic device 4000 of the 11th embodiment is a wearable device, wherein the electronic device 4000 includes an image capturing apparatus 4100. The image capturing apparatus 4100 includes an optical photographing assembly (its reference numeral is omitted) according to the present disclosure and an image sensor (its reference numeral is omitted), wherein the image sensor is disposed on an image surface of the optical photographing assembly.

The foregoing description, for purpose of explanation, has been described with reference to specific embodiments. It is to be noted that Tables 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing assembly comprising, in order from an object side to an image side along an optical axis:
   a first lens element having positive refractive power;
   a second lens element having negative refractive power;
   a third lens element having at least one of an object-side surface and an image-side surface being aspheric;
   a fourth lens element having at least one of an object-side surface and an image-side surface being aspheric; and a fifth lens element having at least one of an object-side surface and an image-side surface being aspheric, wherein at least one of the object-side surface and the image-side surface of the fifth lens element comprises at least one inflection point;

wherein the optical photographing assembly has a total of five lens elements, there is an air space between every two lens elements of the first lens element, the second lens element, the third lens element, the fourth lens element and the fifth lens element that are adjacent to each other, a maximum field of view of the optical photographing assembly is FOV, an axial distance between an image-side surface of one lens element closest to an image surface and the image surface is BL, an axial distance between an object-side surface of one lens element closest to an imaged object and the image-side surface of the lens element closest to the image surface is TD, an axial distance between the second lens element and the third lens element is T23, a central thickness of the first lens element is CT1, a focal length of the optical photographing assembly is f, a curvature radius of the object-side surface of the fourth lens element is R7, and the following conditions are satisfied:

0.10<tan(FOV)<0.85;

0.75<BL/TD<1.50;

0<T23/CT1<0.60; and

−9.50<f/R7<1.50.

2. The optical photographing assembly of claim 1, wherein the focal length of the optical photographing assembly is f, the axial distance between the object-side surface of the lens element closest to the imaged object and the image-side surface of the lens element closest to the image surface is TD, and the following condition is satisfied:

1.50<f/TD<2.50.

3. The optical photographing assembly of claim 1, further comprising:

an aperture stop, wherein an axial distance between the aperture stop and the image-side surface of the lens element closest to the image surface is SD, the axial distance between the object-side surface of the lens element closest to the imaged object and the image-side surface of the lens element closest to the image surface is TD, and the following condition is satisfied:

0.80<SD/TD<1.10.

4. The optical photographing assembly of claim 1, wherein the first lens element has an object-side surface being convex, and the image-side surface of the fifth lens element is concave.

5. The optical photographing assembly of claim 1, wherein the third lens element has positive refractive power, and the fourth lens element has negative refractive power.

6. The optical photographing assembly of claim 1, wherein the focal length of the optical photographing assembly is f, a focal length of the fourth lens element is f4, a focal length of the fifth lens element is f5, and the following conditions are satisfied:

−1.0<f/f4<1.0; and

−1.0<f/f5<1.0.

7. The optical photographing assembly of claim 1, wherein a focal length of the first lens element is f1, a focal length of the second lens element is f2, the focal length of the optical photographing assembly is f, the axial distance between the object-side surface of the lens element closest to the imaged object and the image-side surface of the lens element closest to the image surface is TD, and the following conditions are satisfied:

|f1/f2|<1.0; and 1.72<f/TD<2.20.

8. The optical photographing assembly of claim 1, wherein a sum of thicknesses of the lens elements of the optical photographing assembly is ΣCT, a sum of axial distances between every two of the lens elements of the optical photographing assembly that are adjacent to each other is EAT, and the following condition is satisfied:

3.0<ΣCT/ΣAT<5.0.

9. The optical photographing assembly of claim 1, wherein the central thickness of the first lens element is CT1, a sum of thicknesses of the lens elements of the optical photographing assembly is ΣCT, and the following condition is satisfied:

0.50<CT1/(ΣCT−CT1)<1.80.

10. The optical photographing assembly of claim 1, wherein an Abbe number of the second lens element is V2, an Abbe number of the third lens element is V3, an Abbe number of the fourth lens element is V4, and the following conditions are satisfied:

V2<27.0;

V3<27.0; and

V4<27.0.

11. The optical photographing assembly of claim 1, wherein an effective radius of a lens surface closest to the imaged object is Yo, an effective radius of a lens surface closest to the image surface is Yi, and the following condition is satisfied:

0.95<Yo/Yi<1.15.

12. The optical photographing assembly of claim 1, wherein a maximum among effective radii of object-side and image-side surfaces of the lens elements of the optical photographing assembly is Ymax, a minimum among effective radii of the object-side and the image-side surfaces of the lens elements of the optical photographing assembly is Ymin, and the following condition is satisfied:

1.0<Ymax/Ymin<1.50.

13. The optical photographing assembly of claim 1, further comprising:

an aperture stop, wherein an axial distance between an object-side surface of the first lens element and the aperture stop is Dr1s, an axial distance between an image-side surface of the first lens element and the aperture stop is Dr2s, and the following condition is satisfied:

0<|Dr1s/Dr2s|<1.0.

14. The optical photographing assembly of claim 1, wherein a curvature radius of an object-side surface of the second lens element is R3, a curvature radius of an image-side surface of the second lens element is R4, and the following condition is satisfied:

$-1.5<(R3-R4)/(R3+R4)<0$.

15. The optical photographing assembly of claim 1, wherein a curvature radius of the object-side surface of the third lens element is R5, a curvature radius of the image-side surface of the third lens element is R6, the axial distance between the second lens element and the third lens element is T23, the central thickness of the first lens element is CT1, the focal length of the optical photographing assembly is f, the curvature radius of the object-side surface of the fourth lens element is R7, and the following conditions are satisfied:

$-2.0<(R5+R6)/(R5-R6)<1.0$;

$0<T23\Sigma CT1<0.25$; and $-6.50<f/R7<0.50$.

16. The optical photographing assembly of claim 1, wherein the focal length of the optical photographing assembly is f, a maximum image height of the optical photographing assembly is ImgH, and the following condition is satisfied:

$3.0<f/ImgH<6.0$.

17. The optical photographing assembly of claim 1, wherein the first lens element is a movable focusing lens element, there is a relative displacement between the first lens element and the second lens element, and it is relatively stationary between every two of the second lens element, the third lens element, the fourth lens element and the fifth lens element;

wherein an axial distance between the first lens element and the second lens element with an object distance at infinity is T12i, an axial distance between the first lens element and the second lens element with the object distance at 400 mm is T12m, and the following condition is satisfied:

$0.50<T12i/T12m<0.95$.

18. The optical photographing assembly of claim 1, further comprising:

at least one prism on the optical axis.

19. The optical photographing assembly of claim 18, wherein the axial distance between the object-side surface of the lens element closest to the imaged object and the image-side surface of the lens element closest to the image surface is TD, a sum of light path lengths on the optical axis in the at least one prism is TP, and the following condition is satisfied:

$0.80<TD/TP<1.25$.

20. The optical photographing assembly of claim 18, wherein the prism is disposed at the object side of the first lens element or at the image side of the fifth lens element.

21. An image capturing apparatus, comprising:
the optical photographing assembly of claim 1; and
an image sensor, wherein the image sensor is disposed on the image surface of the optical photographing assembly.

22. An electronic device, comprising:
the image capturing apparatus of claim 21.

* * * * *